United States Patent
Li et al.

(10) Patent No.: US 10,854,885 B2
(45) Date of Patent: Dec. 1, 2020

(54) NON-NOBLE METAL ELECTROCATALYSTS FOR OXYGEN DEPOLARIZED CATHODES AND THEIR APPLICATION IN CHLOR-ALKALI ELECTROLYSIS CELLS

(71) Applicant: Northeastern University, Boston, MA (US)

(72) Inventors: Jingkun Li, Malden, MA (US); Sanjeev Mukerjee, Mansfield, MA (US)

(73) Assignee: Northeastern University, Boston, MA (US)

( * ) Notice: Subject to any disclaimer, the term of this patent is extended or adjusted under 35 U.S.C. 154(b) by 255 days.

(21) Appl. No.: 15/774,409

(22) PCT Filed: Dec. 29, 2016

(86) PCT No.: PCT/US2016/069252
§ 371 (c)(1),
(2) Date: May 8, 2018

(87) PCT Pub. No.: WO2017/117410
PCT Pub. Date: Jul. 6, 2017

(65) Prior Publication Data
US 2019/0386318 A1   Dec. 19, 2019

Related U.S. Application Data

(60) Provisional application No. 62/272,635, filed on Dec. 29, 2015.

(51) Int. Cl.
*H01M 4/90* (2006.01)
*B01J 31/16* (2006.01)
(Continued)

(52) U.S. Cl.
CPC ....... *H01M 4/9008* (2013.01); *B01J 31/1691* (2013.01); *B01J 31/1805* (2013.01);
(Continued)

(58) Field of Classification Search
CPC ............ H01M 4/86; H01M 4/88; H01M 4/90; H01M 4/9008
See application file for complete search history.

(56) References Cited

U.S. PATENT DOCUMENTS 10,326,145 B2 *   6/2019   Liu ..................... H01M 4/9008
10,418,639 B2 *   9/2019   Tylus ................. C25B 11/0489
(Continued)

FOREIGN PATENT DOCUMENTS

WO   2014107726 A1   7/2014

OTHER PUBLICATIONS

Crawford, D. et al., "Synthesis by extrusion: continuous, large-scale preparation of MOF's using little or no solvent", Chemical Science, 2015, vol. 6, No. 3, pp. 1645-1649 doi: 10.1039/c4sc03217a.
(Continued)

*Primary Examiner* — Amanda C. Walke
(74) *Attorney, Agent, or Firm* — Verrill Dana, LLP

(57) ABSTRACT

A simplified and efficient method for preparing non-noble metal catalysts for oxygen reduction reaction (ORR) based on nitrogen containing metal organic framework (MOF) is provided. The method includes formation of a first MOF product through a mechano-chemical reaction between a first transition metal compound and a first organic ligand in the presence of a catalyst. It further includes formation of a second MOF product incorporating a second transition metal and a second organic ligand into the first-MOF product. The second MOF product is converted into an electrocatalyst via pyrolysis, and optionally post-treatment. The electrocatalysts are applicable in various electrochemical systems,
(Continued)

The synthetic process of the FePhenMOF catalyst for ORR including oxygen depolarized cathodes (ODC) for chlorine evolution.

28 Claims, 12 Drawing Sheets

(51) Int. Cl.
- *B01J 31/18* (2006.01)
- *C25B 11/04* (2006.01)
- *H01M 4/86* (2006.01)
- *H01M 4/88* (2006.01)

(52) U.S. Cl.
CPC ............... *C25B 11/04* (2013.01); *H01M 4/86* (2013.01); *H01M 4/88* (2013.01); *H01M 4/90* (2013.01); *H01M 4/9041* (2013.01)

(56) References Cited

U.S. PATENT DOCUMENTS

| | | |
|---|---|---|
| 2009/0306420 A1 | 12/2009 | Schubert et al. |
| 2012/0149560 A1* | 6/2012 | Lee .......................... B01J 37/08 502/305 |
| 2013/0273461 A1 | 10/2013 | Liu et al. |
| 2015/0087795 A1 | 3/2015 | Matyjaszewski et al. |
| 2015/0180045 A1 | 6/2015 | Liu et al. |
| 2015/0340705 A1 | 11/2015 | Tylus et al. |

OTHER PUBLICATIONS

Guo, C. et al., "Synthesis of Non-Noble Nitrogen-Containing Catalysts for Cathodic Oxygen Reduction Reaction: A Critical Review", International Journal of Electrochemical Science, 2015, vol. 10, pp. 2467-2477.

Li, J. et al., "Structural and mechanistic basis for the high activity of iron-nitrogen-carbon electrocatalysts toward oxygen reduction", Energy & Environmental Science, 2016, vol. 9, Issue 7pp. 1-15 DOI: 10.1039/c6ee01160h.

Stojakovic, J. et al., "Vortex grinding for mechanochemistry: application for automated supramolecular catalysis and preparation of a metal-organic framework.", Royal Society of Chemistry, 2012,vol. 48, Issue 64, pp. 7958-7960 doi: 10.1039/C2CC33227B.

* cited by examiner

The synthetic process of the FePhenMOF catalyst for ORR

Balling milling time influence on the MOF structure

Powder XRD patterns of MOF, FePhenMOF, and ZIF-8

Powder XRD patterns of FePhenMOF after pyrolysis

RRDE performance in acid

Electrochemical data for FePhenMOF catalysts (1.5 g batch) with different loadings: (a) performance, (b) number of electrons K-L plot on FePhenMOF catalysts in 0.1 M $HClO_4$ : 1.5 g batch Tafel plot on FePhenMOF catalysts in 0.1 M $HClO_4$ : 1 g batch RRDE performance in alkali Polarization curves of FePhenMOF, Pt/C and Ag (Denora) with pure $O_2$ tested in chlor-alkali electrolysis cells Comparitive studies on the ORR polarization of various catalysts 5 M NaOH, 50-57 °C, 95% $O_2$ Polarization curves of FePhenMOF, Pt/C and Ag/C with 95% $O_2$ tested in chlor-alkali electrolysis cells 20 mV/s, RHE ref., Pt CE, 0.1 M HClO$_4$, 1600 rpm, 0.6 mg/cm$^2$ 20 mV/s, RHE ref., Pt CE, 0.1 M HClO$_4$, 1600 rpm, 0.6 mg/cm$^2$ RRDE profiles of FePhenMOF with different batch sizes and Pt/C in 0.1 M HClO$_4$ Fourier transform of spectra of FePhenMOF electrocatalyst

NON-NOBLE METAL ELECTROCATALYSTS FOR OXYGEN DEPOLARIZED CATHODES AND THEIR APPLICATION IN CHLOR-ALKALI ELECTROLYSIS CELLS

CROSS-REFERENCE TO RELATED APPLICATIONS

The present application claims the benefit of U.S. Provisional Patent Application Ser. No. 62/272,635 filed on Dec. 29, 2015, which is hereby incorporated by reference in its entirety.

BACKGROUND

There has been an increasing demand for chlorine in the last several decades and the worldwide chlorine production exceeded 60 million metric tons in 2013. The current state of the art in chlorine production involves electrolysis of sodium chloride using a membrane based chlor-alkali technology where the cathode reaction involves hydrogen evolution. These state of the art membrane reactors are one of the most energy intensive processes in industry. Chlor-alkali electrolysis operates at a typical current density of 4 kA/m$^2$ corresponding to 3.2 V, with average electric power consumption per ton chlorine amounting to approximately 3.0 MWh. Moreover, this mature membrane technology is believed to have reached its theoretical limit, with majority of the overvoltage arising from the cathodic hydrogen evolution process at high pH. Recently, oxygen depolarized cathodes (ODCs) have become the most intensively studied alternative means to further reduce power consumption.

In chlor-alkali technology, sodium chloride solution is electrolyzed at constant current density, and chloride ions are oxidized to chlorine gas at the anode side. Meanwhile, hydrogen gas and sodium hydroxide solution are formed at the cathode side. The chemical reactions occurring at the electrodes are as follows:

Anode: $2Cl^- \leftrightarrow Cl_2 + 2e^-$ (E=1.358V vs. NHE)

Cathode: $2Na^+ + 2H_2O + 2e^- \leftrightarrow H_2 + 2NaOH$ (E=−0.828 V vs. NHE)

Overall Reaction: $2NaCl + 2H_2O \leftrightarrow 2NaOH + Cl_2 + H_2$ (ΔE=−2.186 V)

The decomposition voltage ΔE of the overall reaction is 2.186 V as per thermodynamic calculations. If the hydrogen evolution reaction at the cathode side is replaced with the oxygen reduction reaction (ORR), the chemical reactions get modified as:

Anode: $2Cl^- \leftrightarrow Cl_2 + 2e^-$ (E=1.358 V vs. NHE)

Cathode: $4Na^+ + 2H_2O + O_2 + 4e^- \leftrightarrow 4NaOH$ (E=0.414 V vs. NHE)

Overall Reaction: $4NaCl + 2H_2O + O_2 \leftrightarrow 4NaOH + 2Cl_2$ (ΔE=−0.957 V)

The calculated decomposition voltage is 0.957 V, and henceforth the driving force for chlorine electrolysis is reduced by 1.23 V theoretically. In practical, a 30% reduction on the total energy consumption at a typical current density of 4 kA/m$^2$ for chlorine production can be projected.

The first chlor-alkali cells utilizing the oxygen-depolarized cathodes (ODC) were developed in the late 1970's at ELTECH Corp., (OH, USA). Despite substantial energy savings by the application of ODC, several drawbacks were manifest, these included: (1) hydrogen, which can be utilized as fuel, is no longer produced; (2) the solubility of oxygen gas being low in aqueous alkaline concentrated solutions, higher mass transport losses occur—hence the requirement of pure oxygen instead of air; and finally, (3) apart from an efficient catalyst design, other issues such as chemical stability and dimensional stability need to be addressed before introducing ODC into the industrial market for chlorine production. As a result a clear economic benefit of using ODC for chlor alkali was debatable.

The first issue, i.e., lack of concomitant hydrogen production, is overcome by aiming the technology where no clear need for hydrogen production exists and the gas is mostly flared to the open atmosphere. As to catalyst design, a cost effective, stable, and promising performance can be expected to cover for the losses expected due to the need for using pure oxygen feed stocks. The use of gas diffusion electrode (GDE) can solve the issue regarding the low solubility of oxygen in alkaline solutions. GDEs provide a conductive porous structure enabling efficient percolation of oxygen. The critical facet involves the effective formation of a gas/liquid/solid three-phase boundary comprising of interfaces with oxygen, electrolyte solution and the catalyst particles. High oxygen reduction rate and, consequently, a high chlorine production rate, can be obtained by modulating the oxygen flow rate to avoid the mass transport control of the reaction.

Long-term stability of ODCs is mainly dependent on the formation of an intermediate product, namely, hydrogen peroxide, via a parallel two-electron process as a part of the four electron oxygen reduction reaction. However, Hydrogen peroxide reacts with highly concentrated NaOH producing $Na_2O_2$ as a precipitant, which has the potential of blocking gas diffusion channels within the GDE structure. In addition formation of such peroxo species have the additional effect of creating highly reactive hydroxyl and oxyhydroxy radicals (OH*, OOH*) with ability to corrode most catalyst active sites.

Oxygen reduction reaction (ORR) is one of the most studied reactions in energy conversion systems due to the large overpotential caused by the slow kinetics. Extensive research on designing catalysts for ORR in alkaline solutions have been performed using various materials, including Pt, Pd, Ru, Au, Cu, Ag, transition metal oxides and sulfides, metal porphyrins and phthalocyanines, and perovskites. Platinum based electrocatalyst remain as the best catalyst for ORR in proton exchange membrane fuel cells (PEMFCs). However, when applied to alkaline medium, Ag exhibits comparable activity to Pt/C and is more economical. In addition it is more resistant to uncontrolled shut down compared to Pt/C, which typically undergoes dissolution in the highly concentrated NaOH solution.

Several such non-noble metal catalysts have been proved to have performance close to the level achieved by platinum. Cobalt phthalocyanine has been observed to catalyze the ORR (Jasinski, R. J. 1965, *J. Electrochem. Soc.* 112, 526-528), and others have explored a variety of synthetic methods to develop non-precious metal catalysts and further improve their electrocatalytic activity. To date, the best non-precious metal catalysts are obtained through heat treatment (500-1000° C.) in the presence of source of a transition metal (mostly Fe and Co), carbon, and nitrogen. The introduction of metal organic frameworks (MOFs) as sacrificial templates has brought a revolution in electrocatalysis research. MOFs with large surface area, optimum porosity and high nitrogen content, stand as excellent candidates to act as sacrificial templates in preparing non-noble metal catalysts for ORR. Currently, most of the MOF fabrication processes are based on the traditional solution reactions for an extended period of time, which need either excessive amount of ligand or a huge amount of solvent, or both. Thus, the low yielding synthesis and comprehensive separation methods of MOFs seriously constrain the application of MOF-based catalysts for ORR.

SUMMARY OF THE INVENTION

The present invention is directed to a highly efficient method of synthesizing an electrocatalyst for carrying out oxygen reduction reactions. All steps of the method can be carried out in a single container in the absence of any solvent or in the presence of only a trace amount of amount of solvent. The method eliminates the need for separating reaction intermediates and products from unused solvent, thereby increasing its efficiency. The method also eliminates the requirement for excessive amounts of reactants, thereby reducing cost of the synthesizing the electrocatalyst.

The term "mechano-chemical reaction" is used herein to mean a chemical reaction that is induced by the direct absorption of mechanical energy. Examples of mechano-chemical reaction include shearing, stretching, and grinding. Grinding may be carried out, for example, through ball milling or through twin screw extrusion.

The invention can be further summarized by the following list of embodiments:

1. A method of synthesizing an electrocatalyst for an oxygen reduction reaction, the method comprising:

(a) reacting, using a mechano-chemical reaction, a first organic ligand, a first transition metal or an oxide or a salt thereof, and a catalyst, thereby generating a partially or fully formed first metal organic framework (MOF) product containing the first transition metal, wherein the reaction is performed in the absence of solvent or in the presence of a trace amount of a solvent, and the catalyst is an acid or an inorganic salt;

(b) incorporating into the first MOF product a second organic ligand and a second transition metal or a salt thereof, wherein the second organic ligand and the second transition metal or the salt thereof coat the surface and/or incorporate into pores of the MOF to generate a second MOF product; and (c) subjecting the second MOF product to pyrolysis, whereby most of the first transition metal evaporates, yielding the electrocatalyst.

2. The method according to embodiment 1, wherein the mechano-chemical reaction comprises ball milling.

3. The method according to any of embodiments 1-2, wherein step (b) comprises a mechano-chemical reaction.

4. The method according to any of embodiments 1-3, wherein the mechano-chemical reaction comprises ball milling.

5. The method according to any of embodiments 1-4, wherein the first and second MOF products are not separated from other reaction components.

6. The method according to any of embodiments 1-5, wherein the first MOF product contains at least two different transition metals.

7. The method according to any of embodiments 1-6, wherein the second MOF product contains at least two different transition metals.

8. The method according to any of embodiments 1-7, wherein both steps (a) and (b) comprise uniformly mixing the reactants mechanically.

9. The method according to any of embodiments 1-8, wherein at least one of the first organic ligand and the second organic ligand is a heteroatom-containing organic molecule, the heteroatom being capable of catalyzing an oxygen reduction reaction.

10. The method according to any of embodiments 1-9, wherein the heteroatom-containing organic molecule comprises one or more heteroatoms selected from the group consisting of nitrogen, oxygen, phosphorus, and sulfur.

11. The method according to any of embodiments 1-10, wherein the pyrolysis is carried out at a temperature from about 600° C. to about 1100° C.

12. The method according to any of embodiments 1-11, wherein the pyrolysis is carried out in the presence of an inert gas carrier selected from the group consisting of argon, helium and nitrogen, or in the presence of a reductive gas carrier selected from the group consisting of ammonia, pyridine, and acetonitrile.

13. The method according to any of embodiments 1-12, further comprising, after step (c), subjecting the electrocatalyst to one or more treatments selected from the group consisting of acid washing, ball milling, and heating in an inert or reductive gas.

14. The method according to any of embodiments 1-13, wherein the electrocatalyst is heated in an inert gas and the inert gas is selected from the group consisting of argon, helium, and nitrogen, or wherein the electrocatalyst is heated in a reductive gas and the reductive gas is selected from the group consisting of ammonia, pyridine, and acetonitrile.

15. The method according to any of embodiments 1-14, wherein the second transition metal is selected from the group consisting of iron, cobalt, manganese, nickel, copper, zinc, chromium, and combinations thereof.

16. The method according to any of embodiments 1-15, wherein the first transition metal is selected from the group consisting of zinc, molybdenum, cobalt, iron, nickel, copper, manganese, and combinations thereof.

17. The method according to any of embodiments 1-16, wherein the first and the second transition metals have oxidation states selected from the group consisting of all known oxidation states for the respective transition metal.

18. The method according to any of embodiments 1-17, wherein the first transition metal is in a salt form or an oxide form, and the second transition metal is in a salt form.

19. The method according to any of embodiments 1-18, wherein the salt of the first and second transition metals is selected from the group consisting of acetate, nitrate, sulfate, phosphate, and chloride.

20. The method according to any of embodiments 1-19, wherein the first organic ligand is selected from the group consisting of imidazole, methylimidazole, pyridine, pyridine derivatives, pyrimidine, triazole, tetrazole, napthylene, and napthyridine.

21. The method according to any of embodiments 1-20, wherein the second organic ligand is selected from the group consisting of phenanthroline, porphyrin, imidazole, pyridine, pyrimidine, and triazole.

22. The method according to any of embodiments 1-21, wherein the acid or inorganic salt is selected from the group consisting of $NaNO_3$, $KNO_3$, $NH_4NO_3$, $Na_2SO_4$, $(NH_4)_2SO_4$, $K_2SO_4$, $Na_2S_2O_3$, $K_2MoO_4$, NaCl, KCl, $NaNO_2$, $NaReO_4$, $NH_4ReO_4$, $NH_4MeSO_3$, formic acid, acetic acid, propionic acid, and citric acid.

23. The method according to any of embodiments 1-22, wherein a trace of solvent is present, and the solvent is selected from the group consisting of dimethylformamide, tetrahydrofuran, diethyl ether, dimethylsulfoxide, ethanol, isopropanol, methanol, and water.

24. The method according to any of embodiments 1-23, wherein the molar ratio of the organic ligand to the first transition metal oxide or salt is between about 2:1 to about 4:1.

25. The method according to any of embodiments 1-24, wherein the electrocatalyst is resistant to anion poisoning when used in an oxygen reduction reaction.

26. The method according to any of embodiments 1-25, wherein steps (a) and (b) are carried out in a single reaction vessel.

27. The method according to any of embodiments 1-26, wherein the second transition metal is in the form of nanoparticles or a colloid accommodated within pores of the first MOF product.

28. The method according to any of embodiments 1-27, wherein the electrocatalyst is cross-linked as a result of the pyrolysis in step (c).

29. A method for chlorine evolution in a chlor-alkali electrolysis cell having an oxygen depolarized cathode, the method comprising, incorporating the electrocatalyst prepared according to any one of embodiments 1-28, into the oxygen depolarized cathode.

30. A method of chlorine evolution comprising electrolyzing HCl in a HCl electrolyzer having a cathode and an anode, wherein the cathode comprises the electrocatalyst according to any of embodiments 1-28.

31. A method of chlorine evolution comprising electrolyzing brine in a NaCl electrolyzer having a cathode and an anode, wherein the cathode comprises the electrocatalyst according to any of embodiments 1-28.

32. A method for generating electrical energy comprising using a fuel cell comprising the electrocatalyst according to any of embodiments 1-28.

33. A cathode for carrying out an oxygen reduction reaction in an electrolytic process, the cathode comprising the electrocatalyst according to any one of embodiments 1-28, wherein the cathode is resistant to anion poisoning.

34. The cathode according to embodiment 33 that is resistant to poisoning by chloride ion.

35. The cathode according to embodiment 33 that is usable at an oxygen concentration of from about 90% to 100%.

36. The electrocatalyst according to any of embodiments 1-28 having a structure comprising a mixture of $Fe^{2+}-N_4$ and iron nanoparticles as active sites.

37. The electrocatalyst according to any of embodiments 1-28 having a structure comprising $FeC_x$ embedded in a nitrogen-doped carbon fiber as active sites.

38. The electrocatalyst according to any of embodiments 1-28 having a structure comprising only $Fe^{2+}-N_4$ as active sites.

39. The electrocatalyst according to any of embodiments 1-28, further comprising nanoparticles, the nanoparticles comprising or consisting of a non-oxidated metal surrounded with a layer of metal oxide.

40. A cathode for a phosphoric acid fuel cell comprising the electrocatalyst according to any one of embodiments 1-28.

41. The cathode according to claim 40 that is resistant to poisoning by dihydrogen phosphate ion.

42. The method according to any of embodiments 1-28, wherein a trace of solvent of less than about 1 wt % is present and a molar ratio of the first transition metal oxide to the solvent is from about 50 to about 3000.

43. The method according to embodiment 42, wherein the molar ratio of the first transition metal to the solvent is from about 25 to about 150.

44. The method according to any of embodiments 1-28, wherein the molar ratio of the first transition metal to the second transition metal is from about 161 to about 10.

45. The method according to embodiment 44, wherein the molar ratio of the first transition metal to the second transition metal is from about 80 to about 20.

46. The method according to any of embodiments 1-28, wherein the molar ratio of the first transition metal oxide to the second organic ligand is from about 4 to about 0.17.

47. The method according to embodiment 46, wherein the ratio of the first transition metal to the second organic ligand is from about 2 to about 0.33.

48. The method according to any of embodiments 1-28, wherein step (a) is performed for a period from about 15 to about 240 minutes and step (b) is performed for about 30 to about 300 minutes.

49. The method according to embodiment 48, wherein step (a) is performed for about 30 to about 120 minutes and step (b) is performed for about 60 to about 150 minutes.

50. The method according to any of embodiments 1-28 or 42-49, wherein the amount of first transition metal incorporated into the electrocatalyst is from about 1 wt % to about 3 wt %.

51. The method according to any of embodiments 1-28 or 42-50, further comprising:

(d) etching the product of the pyrolysis in (c) with a 1-5 M acid solution; and (e) performing a second pyrolysis on the produce of (d) in a nitrogen-containing atmosphere, such as $NH_3$, at a temperature in the range from about 850° C. to about 1100° C.

DETAILED DESCRIPTION OF THE INVENTION

The present invention provides a method for synthesizing metal organic frameworks using mechano-chemical reactions for use in the production of an electrocatalysts for oxygen reduction reactions. The method has several unique features. In contrast to the conventional solution reaction methods, no solvent or only trace amounts of a solvent is used in the method.

As such, the method does not require a step for separating reaction intermediates/products from unused solvent. In addition, the method eliminates the need for using excessive amounts of reactants, thereby reducing cost. Further, all of the steps of the method are carried out in a single vessel, making the method more efficient and cost effective.

Figure 1:
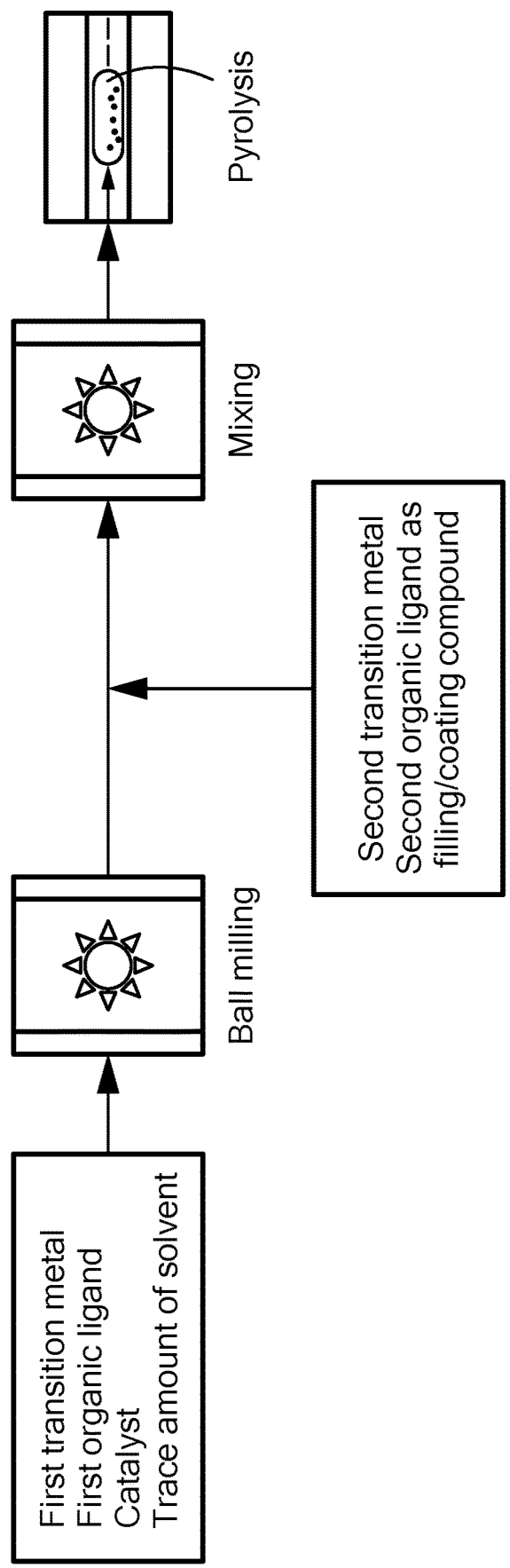
FIG. 1 is a schematic diagram for synthesizing non-noble metal catalysts (electrocatalysts) for ORR using a solid state reaction such as ball milling. Metal organic frameworks (MOFs) are used as precursors in the synthesis.
Figure 2:
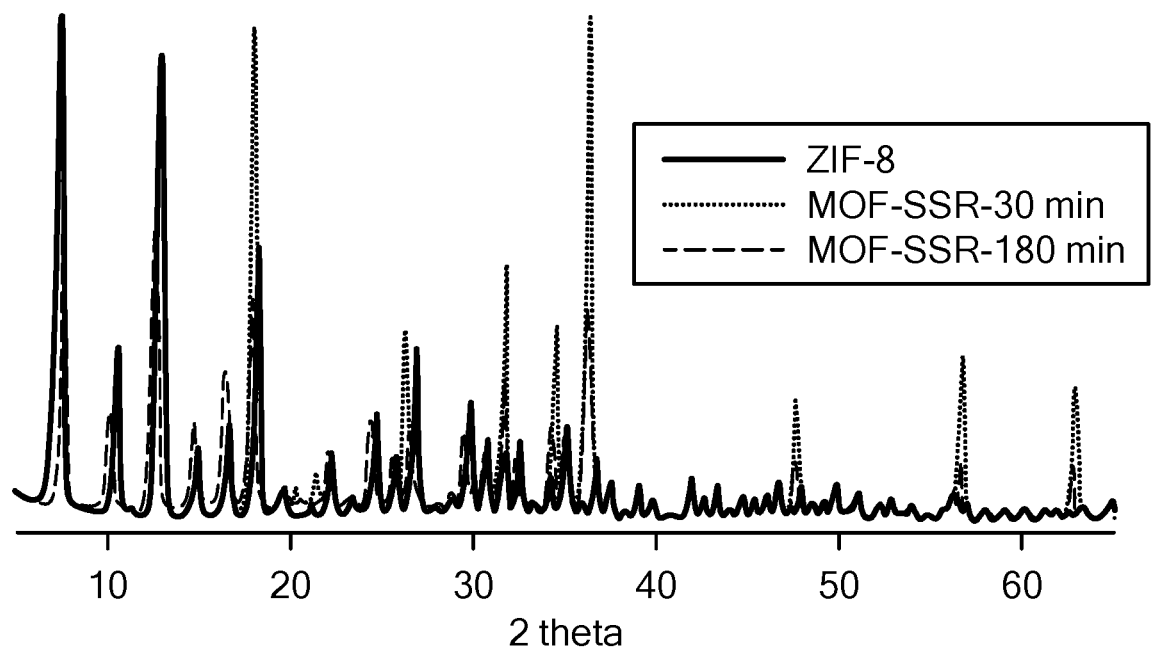
FIG. 2 is a plot comparing the X-ray diffraction pattern of MOFs synthesized through solid state reactions with different ball milling times to a simulated X-ray diffraction pattern based on ZIF-8 crystal structure. The reaction products acquire the characteristic ZIF-8 crystal structure after 30 minutes of ball milling. The structure endures even with an additional 150 minutes of ball milling.
Figure 3:
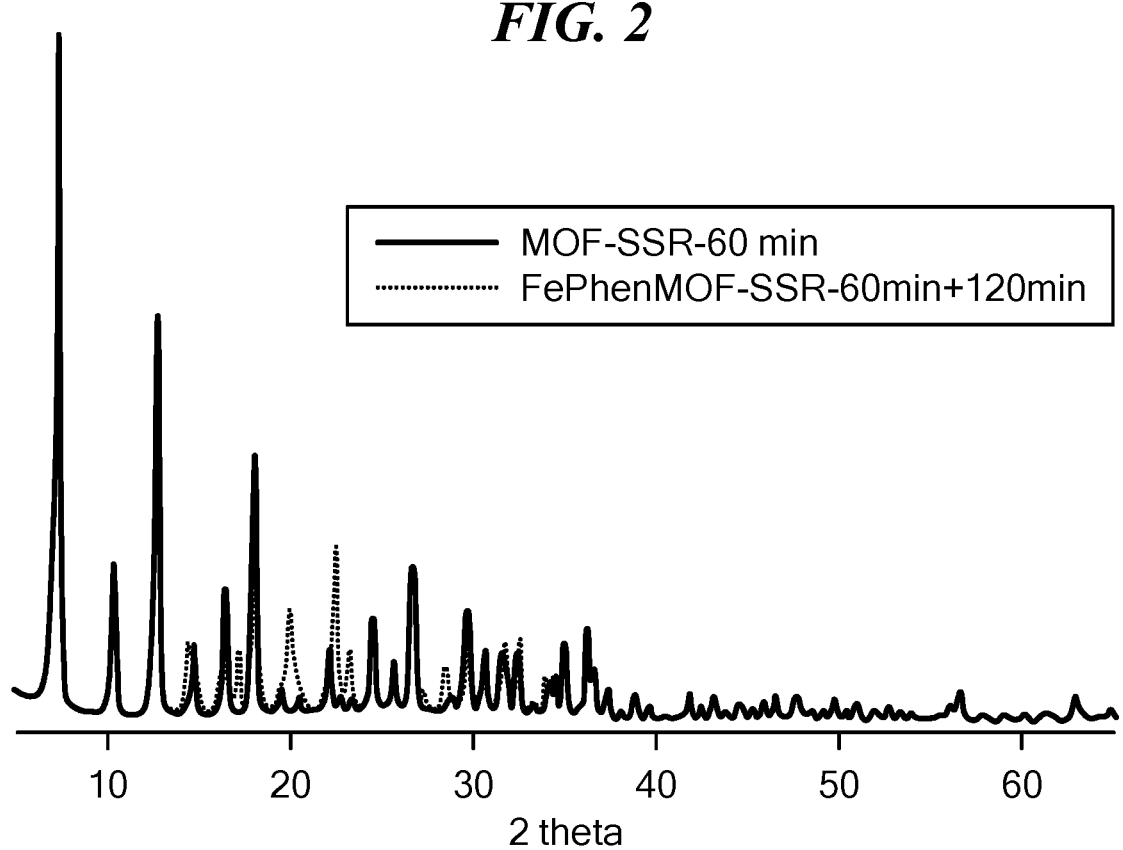
FIG. 3 is a plot showing the X-ray diffraction pattern of the MOF and FePhenMOF precursors synthesized through solid state reactions compared to a simulated X-ray diffraction pattern based on ZIF-8 crystal structure. Ball milling phenanthroline and iron acetate with as-prepared MOF (i.e., MOF prepared in the previous step) doesn't disturb the ZIF-8 crystal structure of the MOF.

FIG. 1 shows a schematic representation of one embodiment of the method to synthesize an electrocatalyst for an oxygen reduction reaction. In this embodiment the mechano-chemical reaction between a transition metal oxide and an organic ligand is carried out through ball milling in the presence of a catalyst. It was observed that certain acids and ammonium salts can facilitate the synthesis of MOF. Without intending to be limited by any theory or mechanism of action, it is believed that acid and base properties of $H^+$ and $NH_4^+$ ions, respectively, aid in the reaction. Using this method, the reaction time for producing the electrocatalyst was significantly reduced relative to the time required using conventional wet chemistry approach. For example, while synthesis of ZIF-8 MOF using solution reaction requires over 24 hours, mechanically activated synthesis, i.e., synthesis using mechano-chemical reaction, allows the MOF to be obtained within 1 hour (FIG. 2). Any one of the inorganic salts selected from the group consisting of $NaNO_3$, $KNO_3$, $NH_4NO_3$, $Na_2SO_4$, and $(NH_4)_2SO_4$, can be used as a catalyst. Also, any one of the following acids, namely, formic acid, acetic acid, propionic acid and citric acid may be used as a catalyst to form the MOF. The MOF obtained is not used directly to prepare catalysts for ORR. Instead, a second transition metal (Fe, Co, etc.) and a second organic ligand are incorporated into the MOF. The second transition metal and organic ligand serve as part of the MOF or associate with MOF by incorporation into its pores or coating its surface. Transition metals that may be used as a second transition metal include Fe, Co, Ni, Cu, Mn, Cr, and Ta. In certain embodiments, phenanthroline and iron acetate are utilized as the second filling/coating organic ligand and the second transition metal source, respectively. The use of the second transition metal and the second organic ligand does not disturb the crystal structure of ZIF-8. See the X ray diffraction pattern in FIG. 3 demonstrating that the MOF structure (solid line) is retained even after additional two hours of ball milling.

Figure 4:
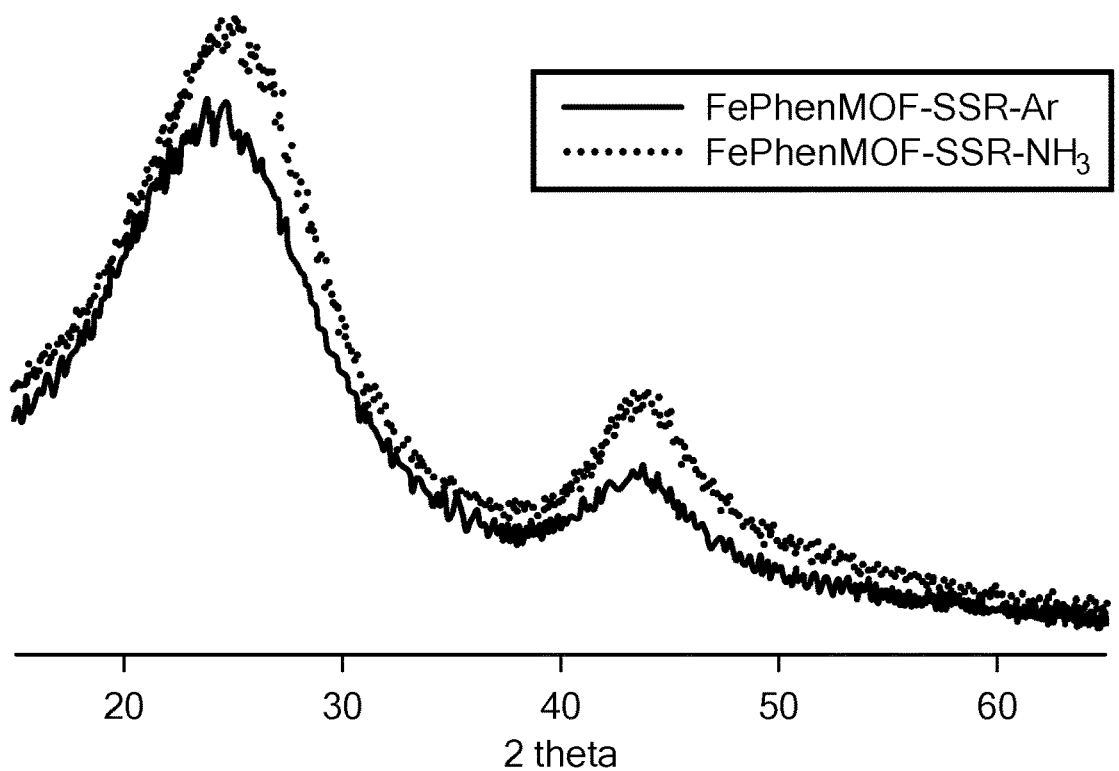
FIG. 4 is a plot showing the X-ray diffraction pattern of a FePhenMOF catalyst obtained after a first pyrolysis in argon and that obtained after a second pyrolysis in $NH_3$.
Figure 5:
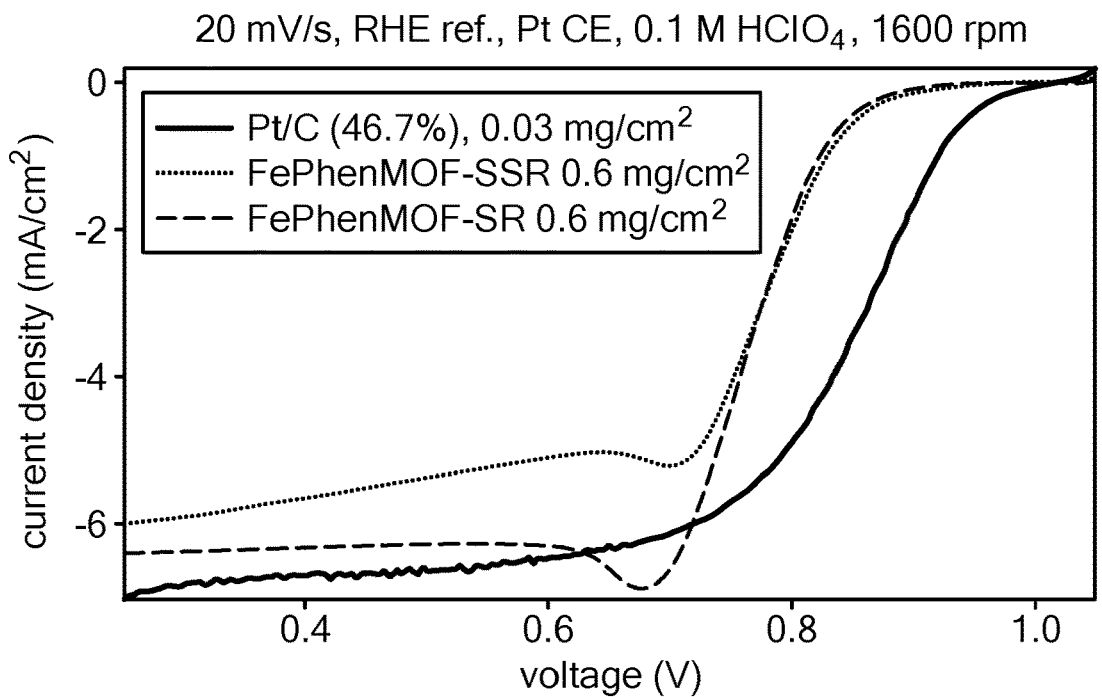
FIG. 5 is a graph showing oxygen reduction reaction polarizations of electrolytic reactions obtained using a rotating ring disk electrode (RRDE) with FePhenMOF catalysts synthesized through (i) solid state reaction (SSR) and (ii) traditional solution reaction (SR) alongside those obtained with platinum as benchmark in 0.1 M $HClO_4$ at room temperature. The non-noble metal catalysts were loaded at 0.6 mg/cm$^2$.

The step of pyrolysis leads to coordination of the evenly distributed non-noble transition metals with heteroatoms organized into graphene-like carbon sheets. The pyrolysis step may be carried out once or twice, each time in the presence of an inert or a reductive gas. Optionally, etching with strong acid (1-5M) can be performed between first and second pyrolysis steps. In certain instances, the structure of FePhenMOF precursors turned from ordered crystalline (ZIF-8) to amorphous carbon after the first heat treatment, but there was no significant change in the structure after the second heat treatment (FIG. 4). The amorphous material formed after first pyrolysis exhibited porous, alveolar, and interconnected hollow structures as seen by transmission electron microscopy, with abundant pores of 50-100 nm. The ORR polarization of electrolytic reactions measured using a rotating disk electrode (RRDE) with a FePhenMOF catalyst (prepared as described in Example 1 below and referred as sample 1) in 0.1M $HClO_4$ at room temperature is shown in FIG. 5 (light dotted line). ORR polarizations obtained using with Pt/C (solid line) and FePhenMOF synthesized through a solution reaction as the catalyst (bold broken line) are shown for comparison.

Figure 6:
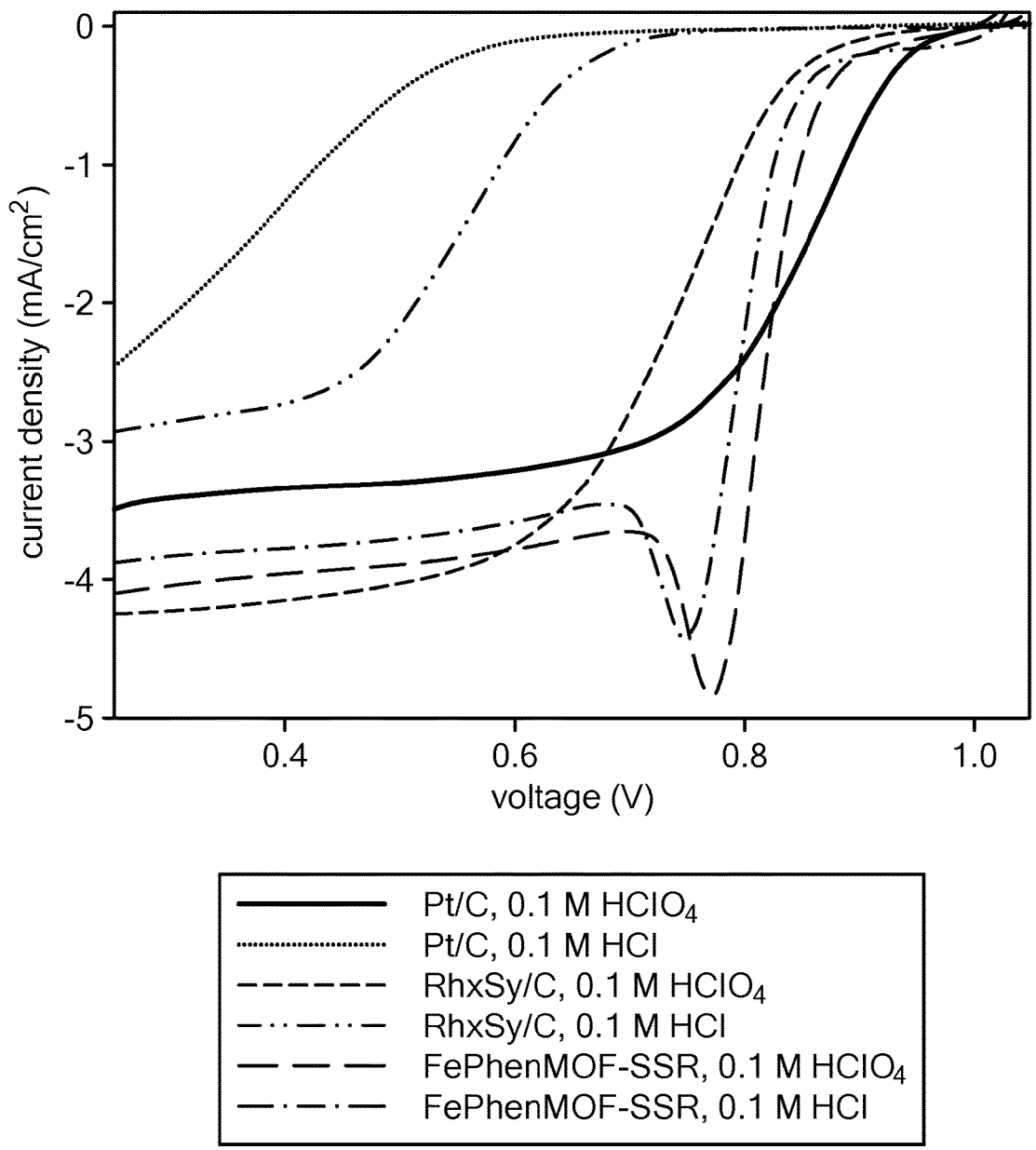
FIG. 6 is a graph of oxygen reduction reaction polarizations of electrolytic reactions obtained using rotating ring disk electrodes with FePhenMOF catalysts synthesized through the solid state reaction in 1M HCl or 1M $HClO_4$ at room temperature. The state of the art Pt/C and $Rh_xS_y$/C catalysts are applied as benchmarks.

Anion poisoning is a common problem in electrocatalysis in aqueous media and results from strong interaction of catalytic metals (Pt, Rh, Ru, etc.) with impurities at potentials above potential of zero charge (PZC). The poisoning blocks access of the reactants (e.g., oxygen in ORR reactions) to the active centers on the metal surface, resulting in increased overpotential. In acidic environment water molecules act as weak anionic species and interact with the metallic surface through the oxygen atoms of hydroxide ions. More electronegative moieties such as chloride or bromide or other anions when present replace the hydroxide ions. The metal-anion interaction grows in strength with increased positive potentials, which is specifically challenging for oxygen reduction reactions as the ORR onset is preferred to occur at high potentials. Even small concentrations of anions result in significant losses in the activity of the catalyst. ORR polarization of electrolytic reactions (in 1M HCl or 1M $HClO_4$), carried out using a FePhenMOF electrocatalyst (sample 1) prepared according to the method described above show the electrocatalyst to be superior compared to the state of the art catalysts in resisting anion poisoning, e.g., chloride ion poisoning (see FIG. 6).

Figure 7:
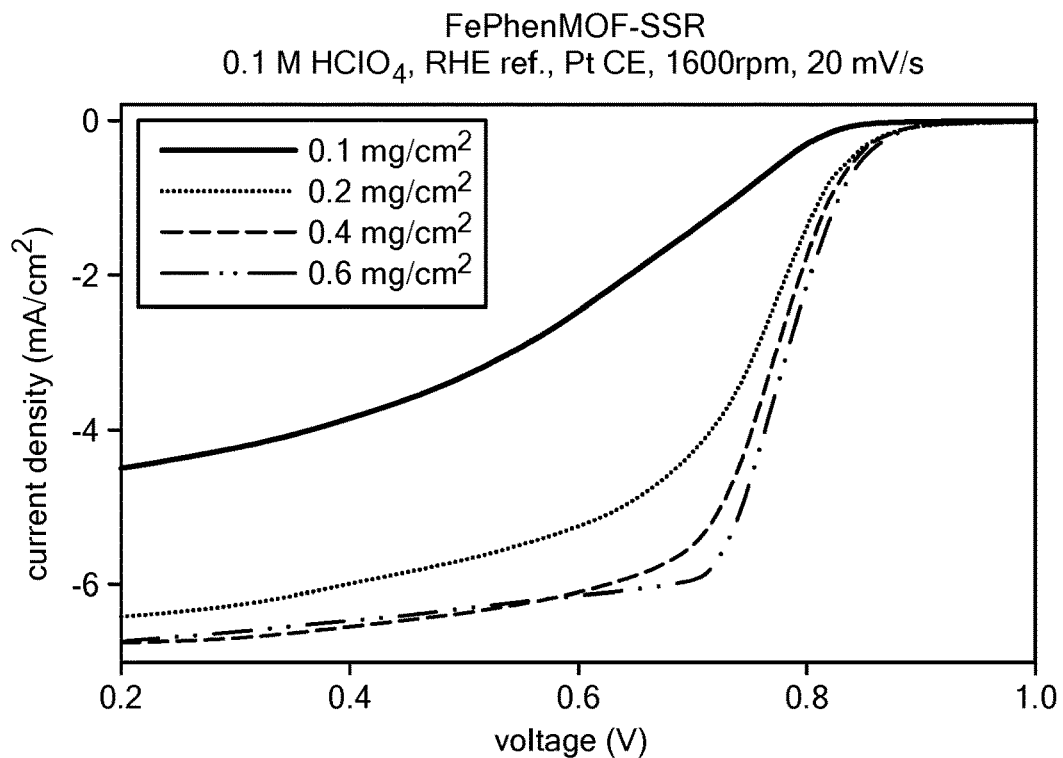
FIG. 7 is a graph of oxygen reduction reaction polarizations of electrolytic reactions using a rotating ring disk electrode with FePhenMOF catalysts synthesized through the solid state reaction with different loadings at 0.1M $HClO_4$ at room temperature.
Figure 8:
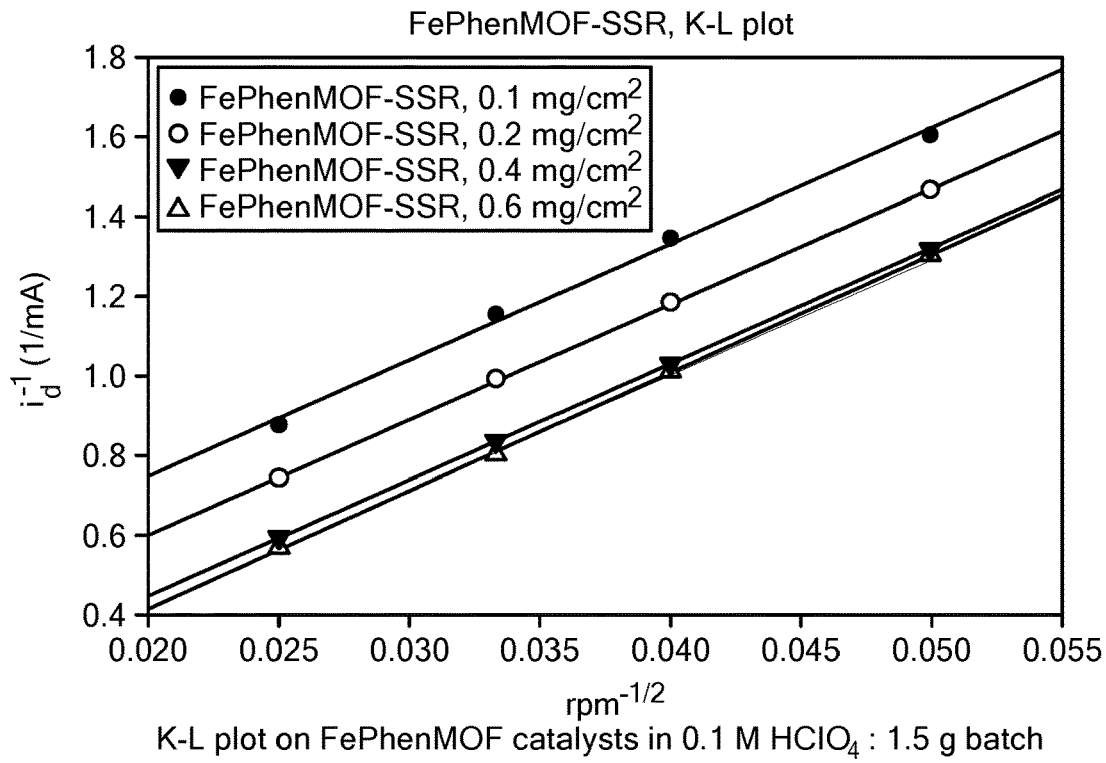
FIG. 8 is a set of Koutechy-Levich plots of rotating ring disk electrode measurements with FePhenMOF catalysts synthesized through the solid state reaction with different loadings at 0.1M $HClO_4$ at room temperature.
Figure 9:
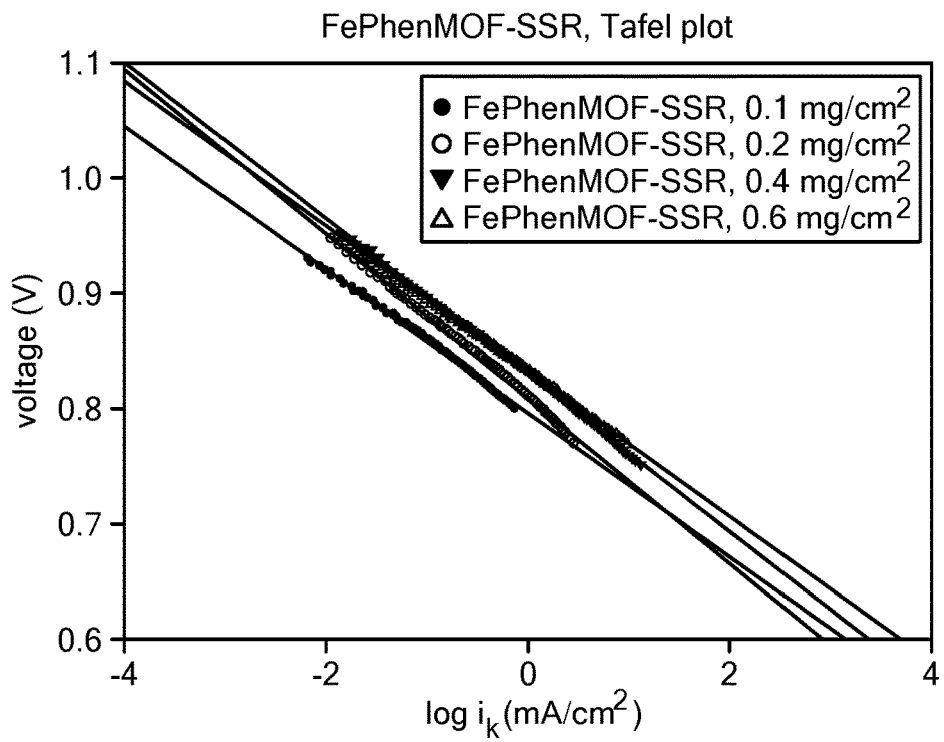
FIG. 9 is a set of Tafel plots of rotating ring disk electrode measurements with FePhenMOF catalysts synthesized through the solid state reaction with different loadings at 0.1M $HClO_4$ at room temperature.

ORR polarizations obtained through the use of a FePhenMOF electrocatalyst (sample 1) loaded onto an electrode in different amounts, measured using a RRDE in 0.1M $HClO_4$ at room temperature are shown in FIG. 7. The corresponding Koutechy-Levich plots and Tafel plots are shown in FIG. 8 and FIG. 9, respectively. Table 1 lists the kinetic current densities and exchange current densities derived from the Koutechy-Levich plots and Tafel plots at various loadings obtained from RRDE in acid. The Tafel slopes and intercepts of the ORR polarization curves under RRDE conditions using the FePhenMOF catalyst in acid are listed in Table 2.

TABLE 1

Kinetic current densities and exchange current densities for FePhenMOF catalyst (sample 1) at various loadings obtained from RRDE in acid.

| Loading (mg/cm$^2$) | n | jk (mA/cm$^2$) | α | J$^0$ (mA/cm$^2$) 1E−6 | k$_e$ (cm/s) 1E−9 |
|---|---|---|---|---|---|
| 100 | 3.89 | 6.01 | 0.93 | 0.11 | 0.25 |
| 200 | 3.92 | 37.45 | 0.81 | 1.30 | 2.91 |
| 400 | 3.90 | −7.67 | 0.85 | 1.26 | 2.83 |
| 600 | 3.82 | −5.71 | 0.92 | 0.51 | 1.17 |

TABLE 2

Tafel slopes and intercepts of the polarization curves for ORR under RRDE conditions with FePhenMOF catalyst (sample 1) in acid.

| Loading (µg/cm$^2$) | Tafel Slope (mV/dec) | Y$_{int}$ (V) | R$^2$ Fit |
|---|---|---|---|
| 100 | 62.3 | 0.7969 | 0.99695 |
| 200 | 71.4 | 0.8079 | 0.99812 |
| 400 | 67.9 | 0.8293 | 0.99890 |
| 600 | 63.0 | 0.8336 | 0.99947 |

Figure 10:
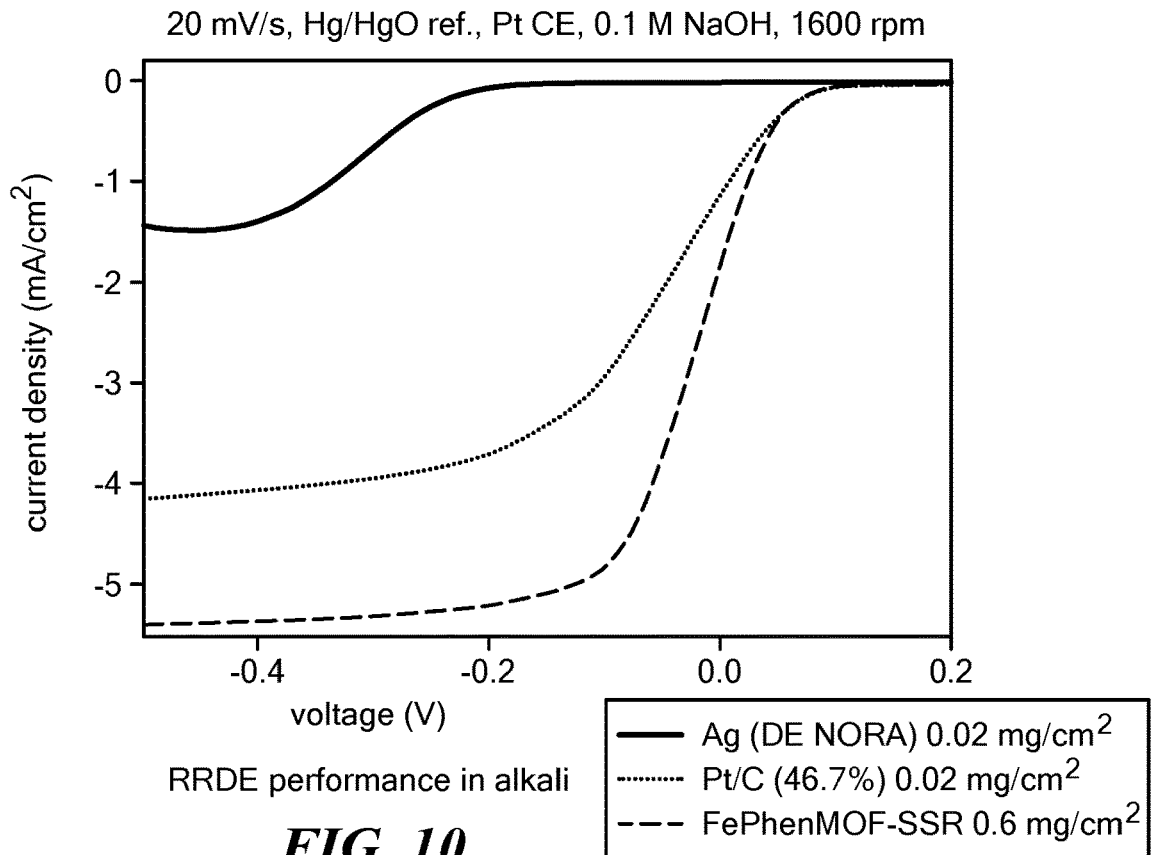
FIG. 10 is a graph of oxygen reduction reaction polarizations of electrolytic reactions using rotating ring disk electrodes with FePhenMOF catalysts synthesized through the solid state reaction at 0.1 M NaOH at room temperature. The state of the art Pt/C and Ag catalysts are applied as benchmarks.

The ORR polarization curves of electrolytic reactions measured using a RRDE with a FePhenMOF catalyst (sample 1) in 0.1M NaOH at room temperature with Pt/C and the Ag (from DE NORA) catalyst as benchmarks are shown in FIG. 10. Remarkably, the FePhenMOF catalyst prepared according to the method of the present disclosure has a superior performance when compared to the state of the art Pt/C and Ag based catalysts in alkali media.

Figure 11:
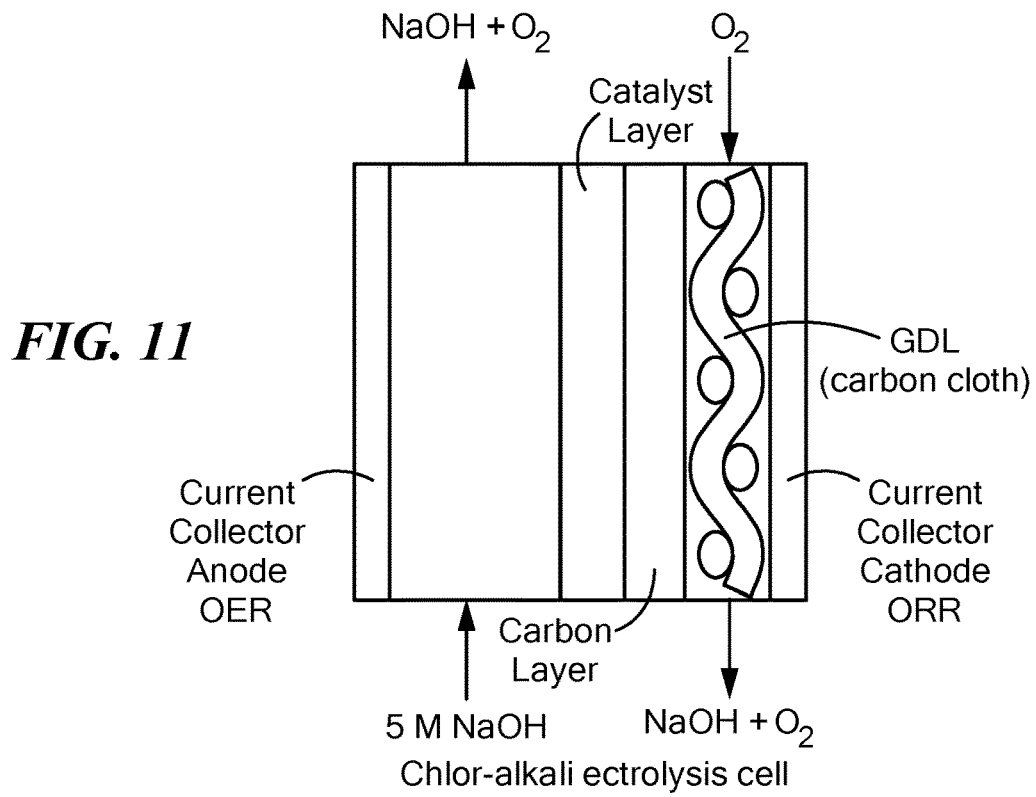
FIG. 11 is a schematic diagram for the half-cell design for the chlor-alkali electrolysis cell. The cathode is oxygen reduction reaction, while the anode is the oxygen evolution reaction. 5 M NaOH electrolytes are pumped through the cell to simulate the actual chlor-alkali electrolysis cells in industry at the cathode side.
Figure 12:
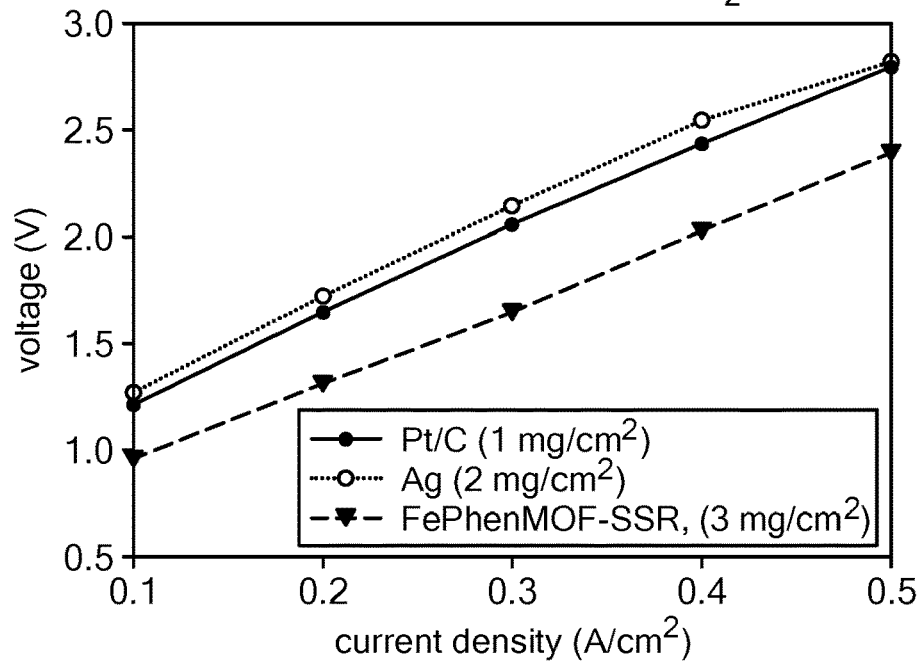
FIG. 12 is a graph of voltage responses as a function of applied current density of a chlor-alkali electrolysis half-cell using FePhenMOF synthesized through the solid state reaction, Pt/C and Ag (Denora) catalysts with pure oxygen as feedstock at the cathode side. 5 M NaOH is utilized as electrolytes.
Figure 13:
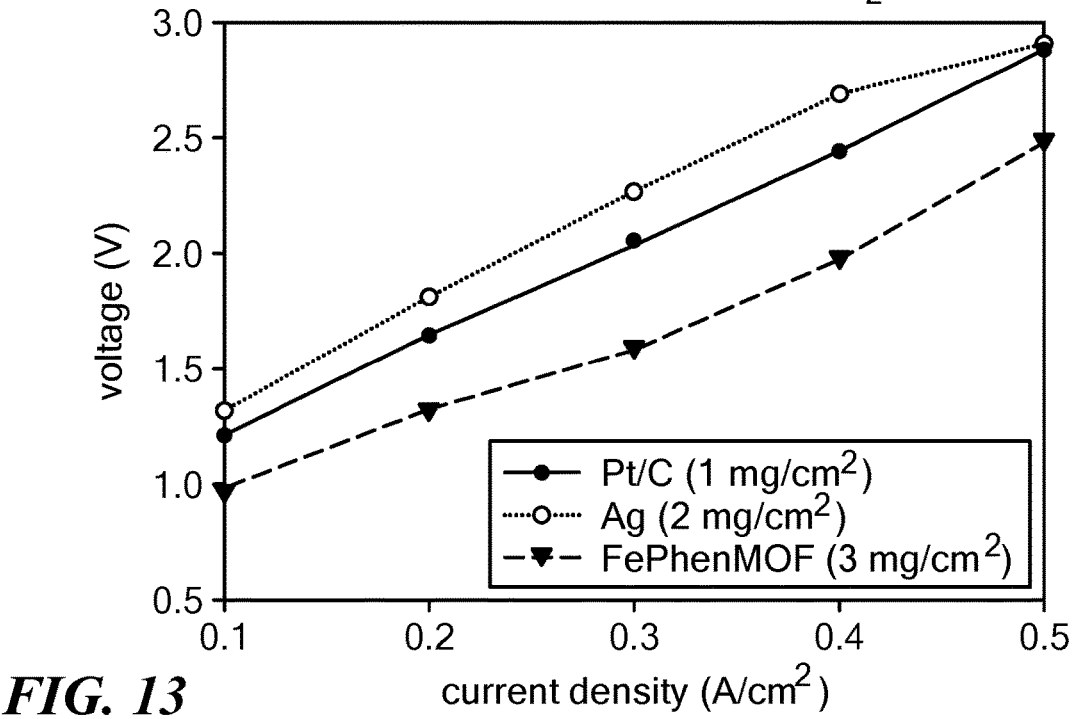
FIG. 13 is a graph of voltage responses as a function of applied current density of a chlor-alkali electrolysis half-cell using FePhenMOF catalysts synthesized through the solid state reaction, Pt/C and Ag (Denora) catalysts with 95% oxygen as feedstock at the cathode side. 5 M NaOH is utilized as electrolytes.

Use of ODCs is expected to reduce total energy consumption for chlorine production at a typical current density of 4 kA/m$^2$ by 30%. The catalysts prepared according to the method described herein were tested in various advanced applications including preparation of oxygen depolarized cathodes for chlorine evolution using chlor-alkali electrolysis cells. FIG. 11 is a schematic diagram of a half-cell design for a chlor-alkali electrolysis cell. While oxygen reduction reaction takes place at the cathode, at the anode oxygen evolution reaction occurs. On the cathode side, 5 M NaOH was pumped to simulate industrial chlor-alkali electrolysis cells. A graph of voltage response as a function of applied current density of a chlor-alkali electrolysis half-cell containing FePhenMOF electrocatalyst synthesized according to the solid state reaction described herein (sample 1) is shown in FIG. 12. For comparison, data obtained using state of the art Pt/C and Ag (Denora) as catalysts and pure oxygen as feedstock at the cathode side are also shown. Clearly, as to chlorine evolution in chlor-alkali electrolysis cells, FePhenMOF electrocatalyst prepared according to the solid state reaction method of the present disclosure has a superior performance compared to the state of the art catalysts such as Pt/C and Ag prepared using noble metals. Additionally, as is clear from FIG. 13, performance of an electrolysis cell containing an ODC having FePhenMOF as a catalyst does not deteriorate when the feedstock at the cathode side changes from pure oxygen to an atmosphere of less than 100% oxygen, e.g., 95% oxygen and 5% nitrogen.

EXAMPLES

Example 1

Figure 14:
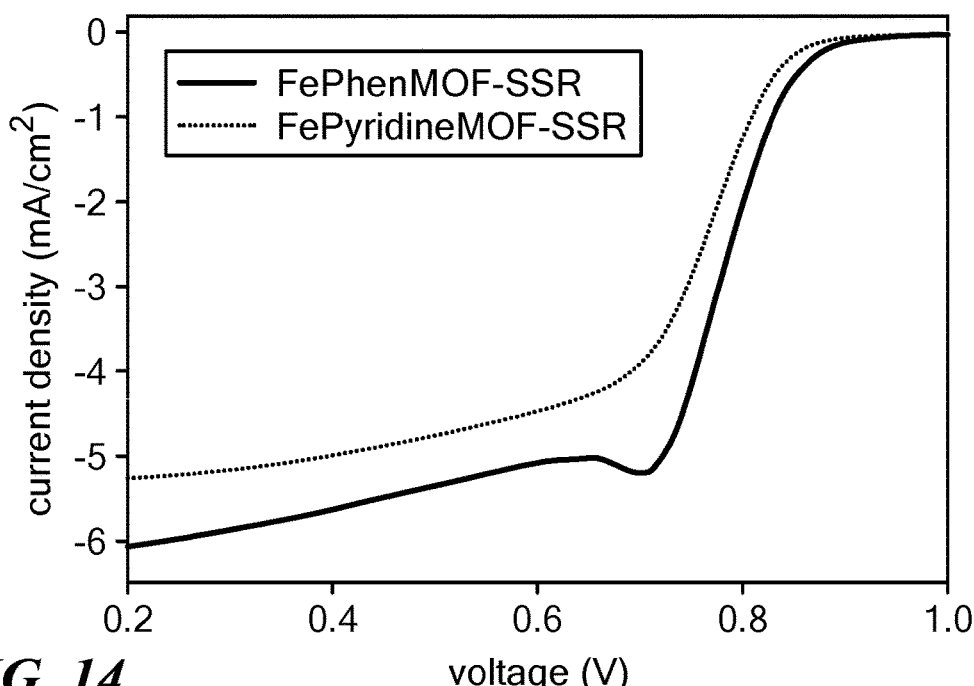
FIG. 14 is a graph of oxygen reduction reaction polarizations of electrolytic reactions using a rotating ring disk electrode with FePhenMOF and FePyridineMOF catalysts synthesized through the solid state reaction at 0.1M $HClO_4$ at room temperature. The two catalysts have different organic ligands for the filling/coating compounds. The loading of the non-noble metal catalysts is 0.6 mg/cm².

A ZIF-8 Metal organic framework (MOF) structure was formed through liquid assisted grinding (LAG) using ammonium sulfate as a catalyst. Zinc oxide and 2-methylimidazole were used as raw materials to form the ZIF-8 structure and iron(II) acetate and phenanthroline were used as the source, respectively, of the second transition metal and the second organic ligand for coating the MOF or filing its pores. First, zinc oxide, 2-methylimidazole, and ammonium sulfate were ball milled with 400 µL MeOH for one hour to form the MOF structure. Then, iron(II) acetate and phenanthroline were added to the as-prepared MOF and ball milled for two hours. The molar ratio of zinc oxide, 2-methylimidazole, ammonia sulfate, iron(II) acetate, and phenanthroline was 1:2:0.04:0.025:2 with ZnO being used at a scale of 10 mmol. The FePhenMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M $HClO_4$ at room temperature, is shown in FIG. 14 (solid line).

Example 2

Zinc oxide and 2-methylimidazole were used as raw materials to form the ZIF-8 structure. Iron(II) acetate and pyridine were used as the source of the second transition metal and the second filling/coating organic ligand to be encapsulated in the MOF structure. First, zinc oxide, 2-methylimidazole, and ammonium sulfate were ball milled with 400 µL MeOH for one hour to form the MOF structure. Iron(II) acetate and pyridine were next added to the as-prepared MOF and ball milled for two hours. The molar ratio of zinc oxide, 2-methylimidazole, ammonia sulfate, iron(II) acetate and pyridine was 1:2:0.04:0.025:2 with ZnO being used at a scale of 10 mmol. The FePyridineMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M $HClO_4$ at room temperature, is shown in FIG. 14 (broken line).

Example 3

Figure 15:
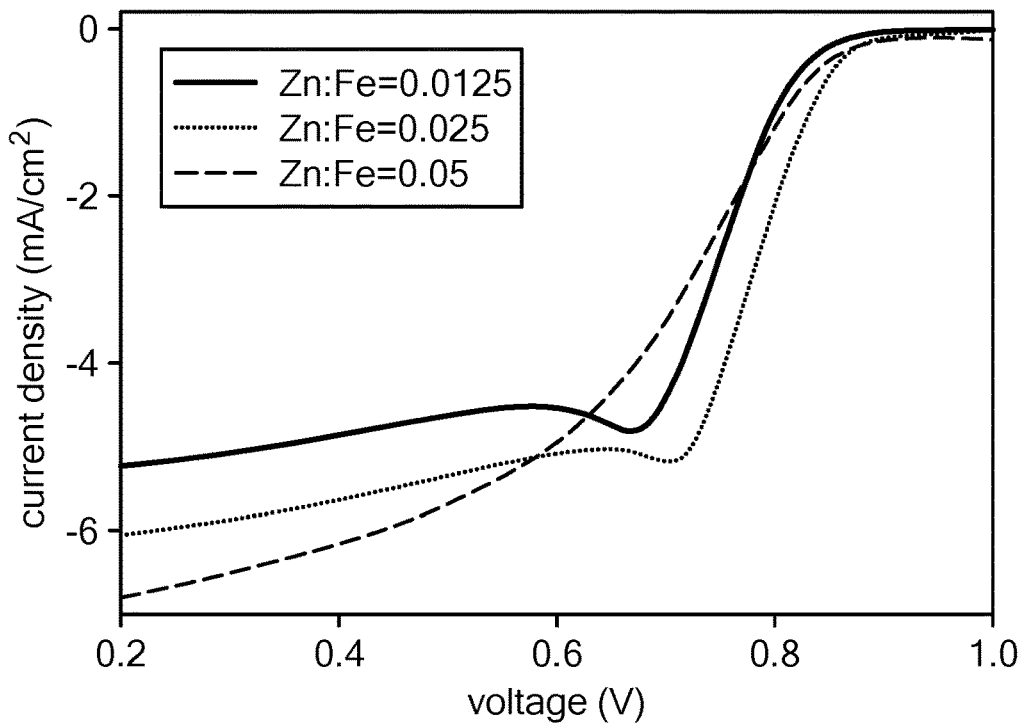
FIG. 15 is a graph of oxygen reduction reaction polarizations of electrolytic reactions using a rotating ring disk electrode with FePhenMOF catalysts synthesized through the solid state reaction at 0.1M $HClO_4$ at room temperature. The catalysts have different ratios of iron acetate in starting materials. The loading of the non-noble metal catalysts is 0.6 mg/cm².

Zinc oxide, 2-methylimidazole, and ammonium sulfate were ball milled with 400 µL MeOH for one hour to completely form the MOF structure. Then iron(II) acetate and phenanthroline were added to the as-prepared MOF and ball milled for two hours. The molar ratio of zinc oxide, 2-methylimidazole, ammonia sulfate, iron(II) acetate and phenanthroline was 1:2:0.04:0.0125:2 with ZnO being used at a scale of 10 mmol. The FePhenMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M $HClO_4$ at room temperature, is shown in FIG. 15 (solid line).

Example 4

Zinc oxide, 2-methylimidazole, and ammonium sulfate were ball milled with 400 µL MeOH for one hour to completely form the MOF structure. Then iron(II) acetate and phenanthroline were added to the as-prepared MOF and ball milled for two hours. The molar ratio of zinc oxide, 2-methylimidazole, ammonia sulfate, iron(II) acetate and phenanthroline was 1:2:0.04:0.05:2 with ZnO being used at a scale of 10 mmol. The FePhenMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M $HClO_4$ at room temperature, is shown in FIG. 15 (bold broken line).

Example 5

Figure 16:
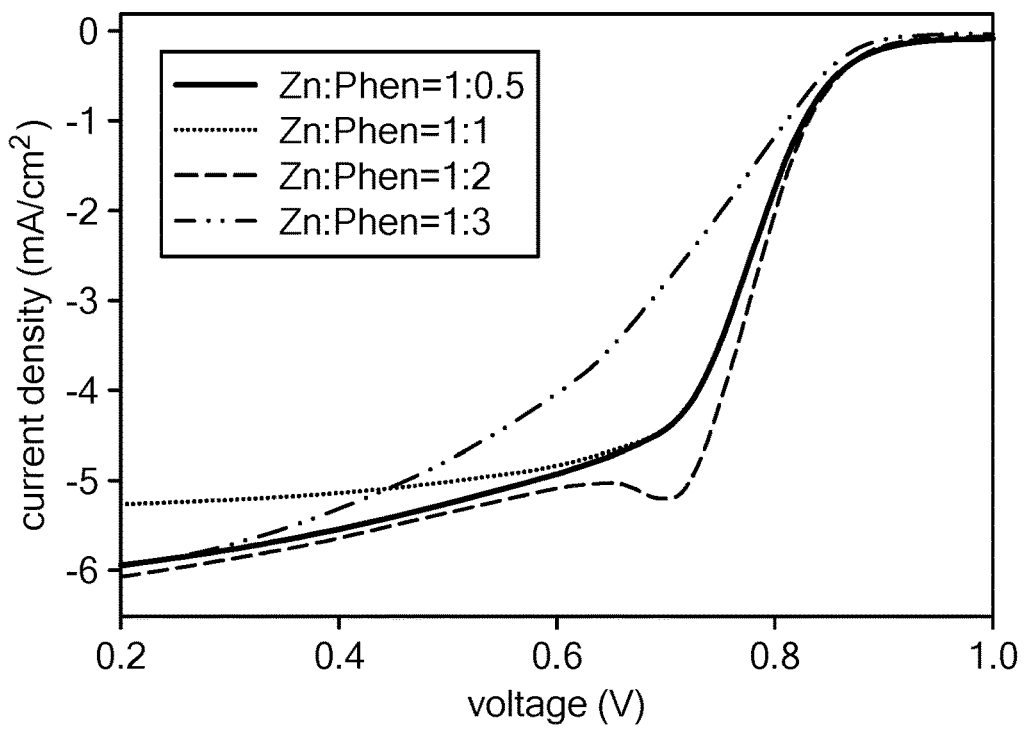
FIG. 16 is a graph of oxygen reduction reaction polarizations of electrolytic reactions using a rotating ring disk electrode with FePhenMOF catalysts synthesized through the solid state reaction at 0.1M $HClO_4$ at room temperature. The catalysts have different ratios of phenanthroline as filling/coating compounds in starting materials. The loading of the non-noble metal catalysts is 0.6 mg/cm².

Zinc oxide, 2-methylimidazole, and ammonium sulfate were ball milled with 400 µL MeOH for one hour to completely form the MOF structure. Then iron(II) acetate and phenanthroline were added to the as-prepared MOF and ball milled for two hours. The molar ratio of zinc oxide, 2-methylimidazole, ammonia sulfate, iron(II) acetate and phenanthroline was 1:2:0.04:0.025:0.5 with ZnO being used at a scale of 10 mmol. The FePhenMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M $HClO_4$ at room temperature, is shown in FIG. 16 (solid line).

Example 6

Zinc oxide, 2-methylimidazole, and ammonium sulfate were ball milled with 400 µL MeOH for one hour to completely form the MOF structure. Then iron(II) acetate and phenanthroline were added to the as-prepared MOF and ball milled for two hours. The molar ratio of zinc oxide, 2-methylimidazole, ammonia sulfate, iron(II) acetate and phenanthroline was 1:2:0.04:0.025:1 with ZnO being used at a scale of 10 mmol. The FePhenMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M $HClO_4$ at room temperature, is shown in FIG. 16 (light dotted line).

Example 7

Zinc oxide, 2-methylimidazole, and ammonium sulfate were ball milled with 400 µL MeOH for one hour to completely form the MOF structure. Then iron(II) acetate and phenanthroline were added to the as-prepared MOF and ball milled for two hours. The molar ratio of zinc oxide, 2-methylimidazole, ammonia sulfate, iron(II) acetate and phenanthroline was 1:2:0.04:0.025:3 with ZnO being used at a scale of 10 mmol. The FePhenMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M $HClO_4$ at room temperature, is shown in FIG. 16 (solid broken line; uppermost curve).

Example 8

Figure 17:
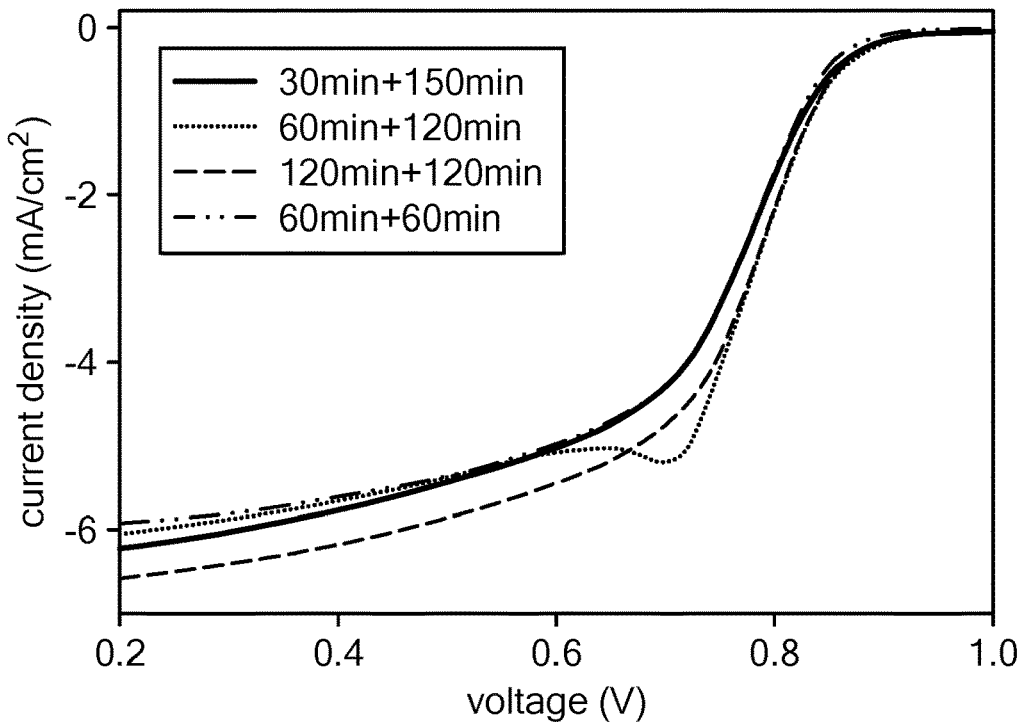
FIG. 17 is a graph of oxygen reduction reaction polarizations of electrolytic reactions using a rotating ring disk electrode with FePhenMOF catalysts synthesized through the solid state reaction at 0.1M $HClO_4$ at room temperature. The catalysts were ball milled for various periods during step (a) and step (b). The loading of the non-noble metal catalysts is 0.6 mg/cm².

Zinc oxide, 2-methylimidazole, and ammonium sulfate were ball milled with 400 µL MeOH for 30 minutes to completely form the MOF structure. Then iron(II) acetate and phenanthroline were added to the as-prepared MOF and ball milled for two and half hours. The molar ratio of zinc oxide, 2-methylimidazole, ammonia sulfate, iron(II) acetate and phenanthroline was 1:2:0.04:0.025:2 with ZnO being used at a scale of 10 mmol. The FePhenMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M HClO$_4$ at room temperature, is shown in FIG. 17 (solid line).

Example 9

Zinc oxide, 2-methylimidazole, and ammonium sulfate were ball milled with 400 μL MeOH for two hours to completely form the MOF structure. Then iron(II) acetate and phenanthroline were added to the as-prepared MOF and ball milled for two hours. The molar ratio of zinc oxide, 2-methylimidazole, ammonia sulfate, iron(II) acetate and phenanthroline was 1:2:0.04:0.025:2 with ZnO being used at a scale of 10 mmol. The FePhenMOF precursor obtained was pyrolyzed under argon and NH$_3$ at 1050° C. for 1 hour and 15 minutes, respectively, with a ramping rate of 15° C./min. The ORR polarization curve of the electrocatalyst generated, obtained using a RRDE in 0.1M HClO$_4$ at room temperature, is shown in FIG. 17 (solid short broken line).

Example 10

Zinc oxide, 2-methylimidazole, and ammonium sulfate were ball milled with 400 μL MeOH for one hour to completely form the MOF structure. Then iron(II) acetate and phenanthroline were added to the as-prepared MOF and ball milled for one hour. The molar ratio of zinc oxide, 2-methylimidazole, ammonia sulfate, iron(II) acetate and phenanthroline was 1:2:0.04:0.025:2 with ZnO being used at a scale of 10 mmol. The FePhenMOF precursor obtained was pyrolyzed under argon and NH$_3$ at 1050° C. for 1 hour and 15 minutes, respectively, with a ramping rate of 15° C./min. The ORR polarization curve of the electrocatalyst generated, obtained using a RRDE in 0.1M HClO$_4$ at room temperature, is shown in FIG. 17 (solid long broken line).

Example 11

Figure 18:
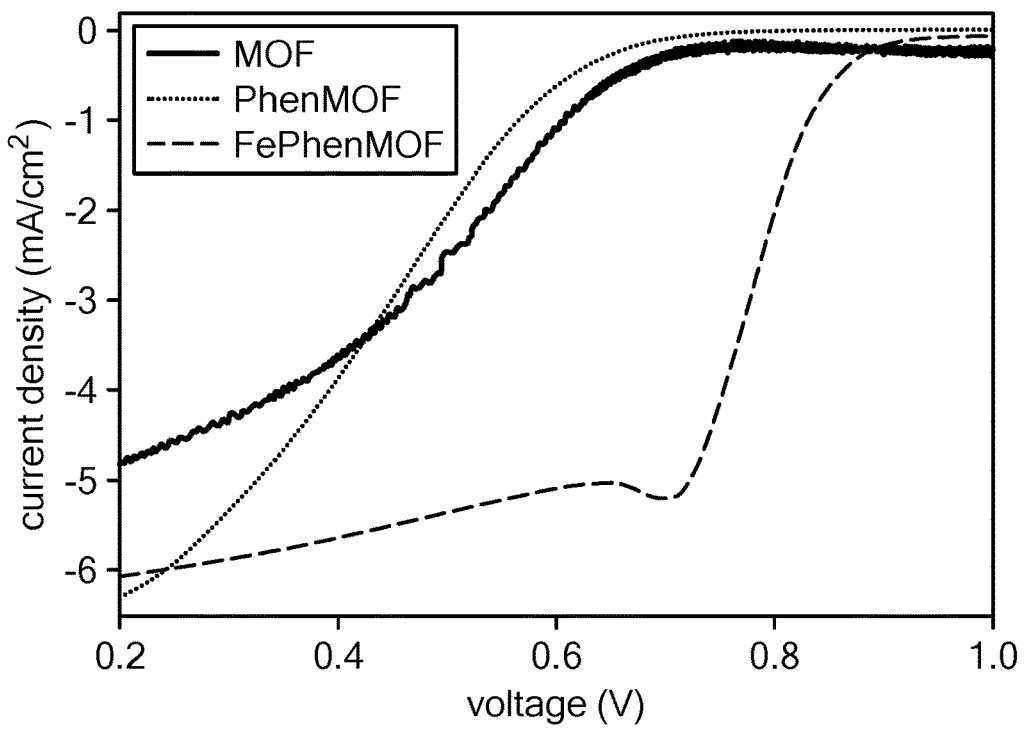
FIG. 18 is a graph of oxygen reduction reaction polarizations of electrolytic reactions using a rotating ring disk electrode with FePhenMOF, PhenMOF and MOF catalysts synthesized through the solid state reaction at 0.1M $HClO_4$ at room temperature. The loading of the non-noble metal catalysts is 0.6 mg/cm². The presence of Fe as a second transition metal improves the performance of those as-prepared catalysts dramatically.

Zinc oxide, 2-methylimidazole, and ammonium sulfate were ball milled with 400 μL MeOH for one hour to completely form the MOF structure. The molar ratio of zinc oxide, 2-methylimidazole, and ammonia sulfate was 1:2:0.04 with ZnO being used at a scale of 10 mmol. The MOF precursor obtained was pyrolyzed under argon and NH$_3$ at 1050° C. for 1 hour and 15 minutes, respectively, with a ramping rate of 15° C./min. The ORR polarization curve of the electrocatalyst generated, obtained using a RRDE in 0.1M HClO$_4$ at room temperature, is shown in FIG. 18 (solid line). For comparison, the ORR polarization curve of the electrocatalyst generated in Example 1, i.e., FePhenMOF, is also shown (solid broken line).

Example 12

Zinc oxide, 2-methylimidazole, and ammonium sulfate were ball milled with 400 μL MeOH for one hour to completely form the MOF structure. Then phenanthroline was added to the as-prepared MOF and ball milled for two hours. The molar ratio of zinc oxide, 2-methylimidazole, and ammonia sulfate was 1:2:0.04 with ZnO being used at a scale of 10 mmol. The MOF precursor obtained was pyrolyzed under argon and NH$_3$ at 1050° C. for 1 hour and 15 minutes, respectively, with a ramping rate of 15° C./min. The ORR polarization curve of the electrocatalyst generated, obtained using a RRDE in 0.1M HClO$_4$ at room temperature, is shown in FIG. 18 (light dotted line). For comparison, the ORR polarization curve of the electrocatalyst generated in Example 1, i.e., FePhenMOF, is also shown (solid broken line).

Example 13

Figure 19:
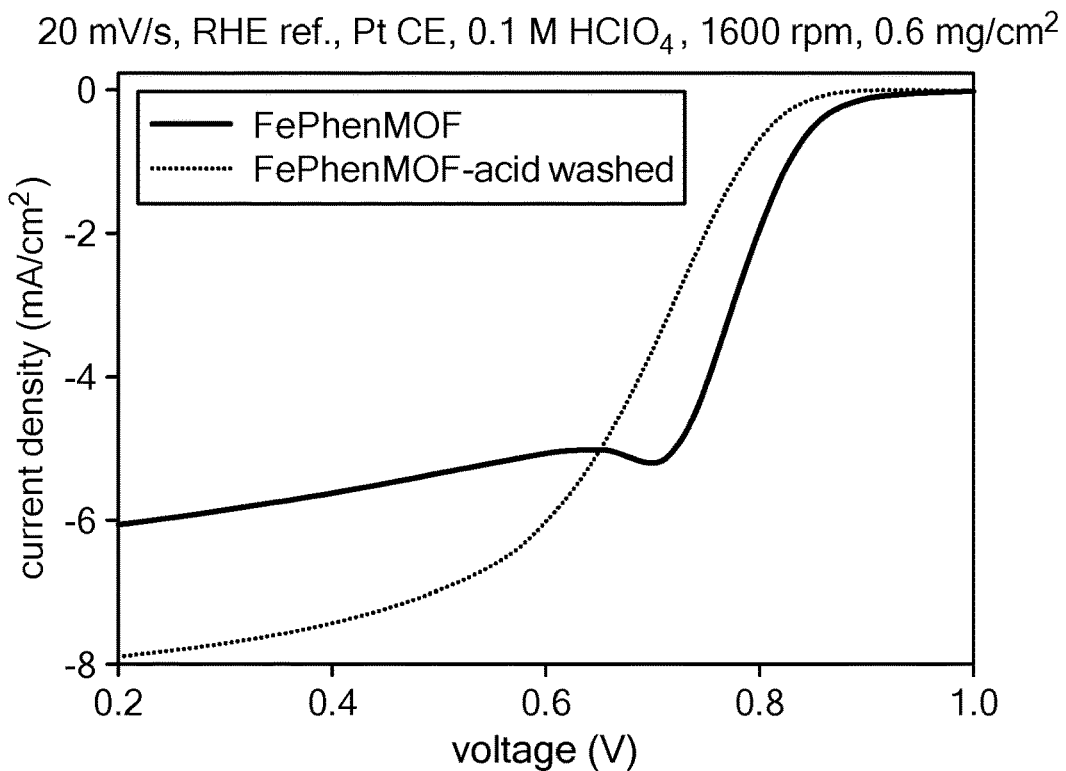
FIG. 19 is a graph of oxygen reduction reaction polarizations of electrolytic reactions using a rotating ring disk electrode with FePhenMOF catalysts synthesized through the solid state reaction with and without acid wash as post treatment at 0.1M $HClO_4$ at room temperature. The loading of the non-noble metal catalysts is 0.6 mg/cm².

Zinc oxide, 2-methylimidazole, and ammonium sulfate were ball milled with 400 μL MeOH for one hour to completely form the MOF structure. Then iron(II) acetate and phenanthroline were added to the as-prepared MOF and ball milled for two hours. The molar ratio of zinc oxide, 2-methylimidazole, and ammonium sulfate, iron(II) acetate, and phenanthroline is 1:2:0.04:0.025:2 with ZnO being used at a scale of 10 mmol. The MOF structure was not destroyed after adding iron(II) acetate and phenanthroline. Next, the FePhenMOF precursor obtained was pyrolyzed under argon and NH$_3$ at 1050° C. for 1 hour and 15 minutes, respectively, with a ramping rate of 15° C./min. Subsequently, FePhenMOF catalysts generated were acid washed in 1 M HCl at 80° C. for 2 hrs. The ORR polarization curve of the electrocatalyst generated, obtained using a RRDE in 0.1M HClO$_4$ at room temperature, is shown in FIG. 19 (light dotted line). For comparison, the ORR polarization curve of the electrocatalyst generated in Example 1, i.e., FePhenMOF, is also shown (solid line).

Example 14

Figure 20:
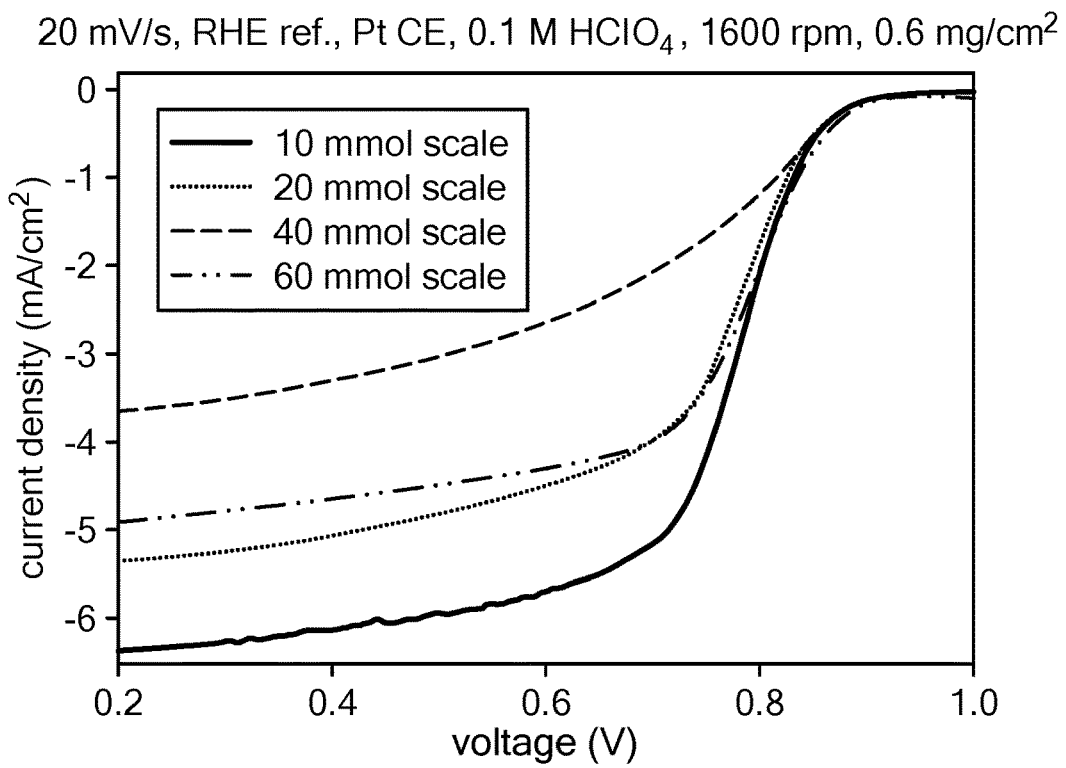
FIG. 20 is a graph of oxygen reduction reaction polarizations of electrolytic reactions using a rotating ring disk electrode with FePhenMOF catalysts synthesized through the solid state reaction with different batch sizes at 0.1M $HClO_4$ at room temperature. The loading of the non-noble metal catalysts is 0.6 mg/cm².
Figure 21:
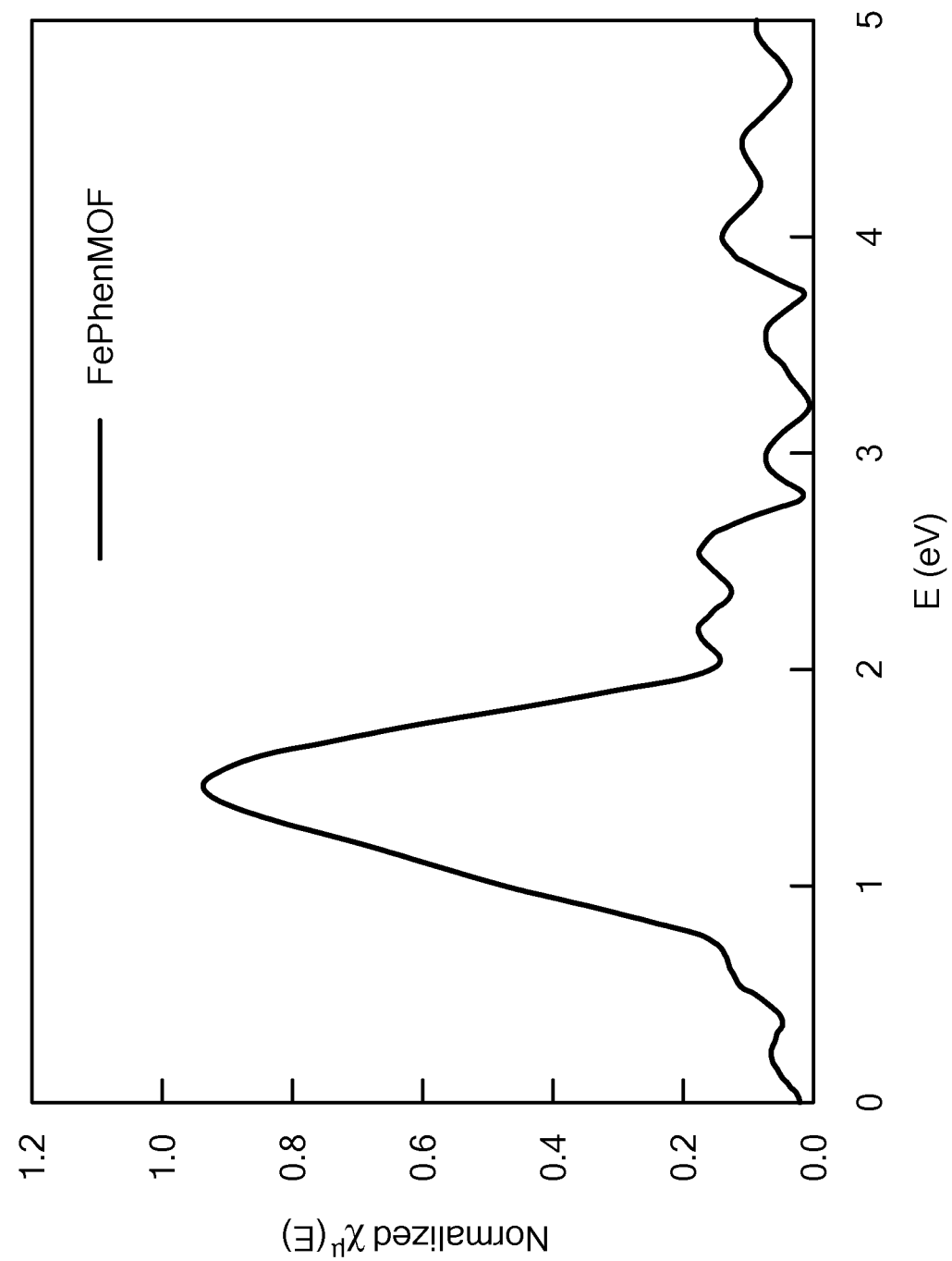
FIG. 21 is a Fourier transform of EXAFS (extended X-ray absorption fine structure) spectra of FePhenMOF electrocatalyst with only Fe—$N_4$ as active sites.

Zinc oxide, 2-methylimidazole, and ammonium sulfate were ball milled with 400 μL MeOH for one hour to completely form the MOF structure. Then iron(II) acetate and phenanthroline were added to the as-prepared MOF and ball milled for two hours. The molar ratio of zinc oxide, 2-methylimidazole, and ammonium sulfate, iron(II) acetate, and phenanthroline was 1:2:0.04:0.025:2 with ZnO being used at a scale of 20 mmol. The FePhenMOF precursor obtained was pyrolyzed under argon and NH$_3$ at 1050° C. for 1 hour and 15 minutes, respectively, with a ramping rate of 15° C./min. The ORR polarization curve of the electrocatalyst generated, obtained using a RRDE in 0.1M HClO$_4$ at room temperature, is shown in FIG. 20 (light dotted line). For comparison, the ORR polarization curve of the electrocatalyst generated in Example 1, i.e., FePhenMOF (ZnO used at a 10 nmol scale), is also shown (solid line).

Example 15

Zinc oxide, 2-methylimidazole, and ammonium sulfate were ball milled with 400 μL MeOH for one hour to completely form the MOF structure. Then iron(II) acetate and phenanthroline were added to the as-prepared MOF and ball milled for two hours. The molar ratio of zinc oxide, 2-methylimidazole, and ammonium sulfate, iron(II) acetate, and phenanthroline was 1:2:0.04:0.025:2 with ZnO being used at a scale of 40 mmol. The FePhenMOF precursor obtained was pyrolyzed under argon and NH$_3$ at 1050° C. for 1 hour and 15 minutes, respectively, with a ramping rate of 15° C./min. The ORR polarization curve of the electrocatalyst generated, obtained using a RRDE in 0.1M HClO$_4$ at room temperature, is shown in FIG. 20 (short broken line). For comparison, the ORR polarization curve of the electrocatalyst generated in Example 1, i.e., FePhenMOF (ZnO used at a 10 nmol scale), is also shown (solid line).

Example 16

Zinc oxide, 2-methylimidazole, and ammonium sulfate were ball milled with 400 μL MeOH for one hour to completely form the MOF structure. Then iron(II) acetate and phenanthroline were added to the as-prepared MOF and ball milled for two hours. The molar ratio of zinc oxide, 2-methylimidazole, and ammonium sulfate, iron(II) acetate, and phenanthroline was 1:2:0.04:0.025:2 with ZnO being used at a scale of 60 mmol. The FePhenMOF precursor obtained was pyrolyzed under argon and $NH_3$ at 1050° C. for 1 hour and 15 minutes, respectively, with a ramping rate of 15° C./min. The ORR polarization curve of the electrocatalyst generated, obtained using a RRDE in 0.1M $HClO_4$ at room temperature, is shown in FIG. 20 (long broken line). For comparison, the ORR polarization curve of the electrocatalyst generated in Example 1, i.e., FePhenMOF (ZnO used at a 10 nmol scale), is also shown (solid line).

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A method of synthesizing an electrocatalyst for an oxygen reduction reaction, the method comprising:
    (a) reacting, using a mechano-chemical reaction, a first organic ligand, a first transition metal or an oxide or a salt thereof, and a catalyst, thereby generating a partially or fully formed first metal organic framework (MOF) product containing the first transition metal, wherein the reaction is performed in the absence of solvent or in the presence of a trace amount of a solvent, and the catalyst is an acid or an inorganic salt;
    (b) mixing the first MOF product with a second organic ligand and a second transition metal or a salt thereof, whereby the second organic ligand and the second transition metal or the salt thereof coat the surface of and/or incorporate into pores of the first MOF product to generate a second MOF product; and
    (c) subjecting the second MOF product to pyrolysis, whereby most of the first transition metal evaporates, yielding the electrocatalyst.

2. The method according to claim 1, wherein the mechano-chemical reaction of step (a) comprises ball milling.

3. The method according to claim 1, wherein step (b) comprises a mechano-chemical reaction.

4. The method according to claim 3, wherein the mechano-chemical reaction comprises ball milling.

5. The method according to claim 1, wherein the first and second MOF products are not separated from other reaction components.

6. The method according to claim 1, wherein the first MOF product contains at least two different transition metals.

7. The method according to claim 1, wherein the second MOF product contains at least two different transition metals.

8. The method according to claim 1, wherein at least one of the first organic ligand and the second organic ligand is a heteroatom-containing organic molecule, the heteroatom being capable of catalyzing an oxygen reduction reaction.

9. The method according to claim 8, wherein the heteroatom-containing organic molecule comprises one or more heteroatoms selected from the group consisting of nitrogen, oxygen, phosphorus, and sulfur.

10. The method according to claim 1, wherein the pyrolysis is carried out at a temperature from about 600° C. to about 1100° C.

11. The method according to claim 1, wherein the pyrolysis is carried out in the presence of an inert gas carrier selected from the group consisting of argon, helium and nitrogen, or in the presence of a reductive gas carrier selected from the group consisting of ammonia, pyridine, and acetonitrile.

12. The method according to claim 1, further comprising, after step (c), subjecting the electrocatalyst to one or more treatments selected from the group consisting of acid washing, ball milling, and heating in an inert or reductive gas.

13. The method according to claim 12, wherein the electrocatalyst is heated in an inert gas and the inert gas is selected from the group consisting of argon, helium, and nitrogen, or wherein the electrocatalyst is heated in a reductive gas and the reductive gas is selected from the group consisting of ammonia, pyridine, and acetonitrile.

14. The method according to claim 1, further comprising:
    (d) etching the product of the pyrolysis in (c) with a 1-5 M acid solution; and
    (e) performing a second pyrolysis on the produce of (d) in a nitrogen-containing atmosphere, such as $NH_3$, at a temperature in the range from about 850° C. to about 1100° C.

15. The method according to claim 1, wherein the second transition metal is selected from the group consisting of iron, cobalt, manganese, nickel, copper, zinc, chromium, and combinations thereof.

16. The method according to claim 1, wherein the first transition metal is selected from the group consisting of zinc, molybdenum, cobalt, iron, nickel, copper, manganese, and combinations thereof, and wherein the first and the second transition metals have oxidation states selected from the group consisting of all known oxidation states for the respective transition metal.

17. The method according to claim 1, wherein the first and the second transition metals have oxidation states selected from the group consisting of all known oxidation states for the respective transition metal.

18. The method according to claim 1, wherein the first organic ligand is selected from the group consisting of imidazole, methylimidazole, pyridine, pyridine derivatives, pyrimidine, triazole, tetrazole, napthylene, and napthyridine.

19. The method according to claim 1, wherein the second organic ligand is selected from the group consisting of phenanthroline, porphyrin, imidazole, pyridine, pyrimidine, and triazole.

20. The method according to claim 1, wherein a trace of solvent is present at less than 1 wt %, and the solvent is selected from the group consisting of dimethylformamide, tetrahydrofuran, diethyl ether, dimethylsulfoxide, ethanol, isopropanol, methanol, and water.

21. The method according to claim 1, wherein the molar ratio of the organic ligand to the first transition metal oxide or salt is from about 2:1 to about 4:1.

22. The method according to claim 1, wherein steps (a) and (b) are carried out in a single reaction vessel.

23. The method according to claim 1, wherein the second transition metal is in the form of nanoparticles or a colloid accommodated within pores of the MOF.

24. The method according to claim 1, wherein the electrocatalyst is cross-linked as a result of the pyrolysis in step (c).

25. The method according to claim 1, wherein a trace of solvent is present in and a molar ratio of the first transition metal oxide to the solvent is from about 50:1 to about 3000:1.

26. The method according to claim 1, wherein the molar ratio of the first transition metal to the second transition metal is from about 161:1 to about 10:1.

27. The method according to claim 1, wherein the molar ratio of the first transition metal to the second organic ligand is from about 4:1 to about 0.17:1.

28. The method according to claim 1, wherein the amount of first transition metal incorporated into the electrocatalyst is from about 1 wt % to about 3 wt %.

* * * * *